US009649962B2

(12) United States Patent
Line et al.

(10) Patent No.: US 9,649,962 B2
(45) Date of Patent: *May 16, 2017

(54) INDEPENDENT CUSHION EXTENSION AND THIGH SUPPORT

(71) Applicant: Ford Global Technologies, LLC, Dearborn, MI (US)

(72) Inventors: Johnathan Andrew Line, Northville, MI (US); Marc Kondrad, Macomb, MI (US); John W. Jaranson, Dearborn, MI (US); Kendrick Alden Harper, Temperance, MI (US); Daniel Ferretti, Commerce Township, MI (US); Michael Kolich, Windsor (CA); Lorne Joseph Lovelace, Macomb, MI (US); Kevin VanNieulande, Fraser, MI (US); Grant A. Compton, Livonia, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 0 days.

This patent is subject to a terminal disclaimer.

(21) Appl. No.: 15/190,998

(22) Filed: Jun. 23, 2016

(65) Prior Publication Data

US 2016/0304016 A1 Oct. 20, 2016

Related U.S. Application Data

(63) Continuation of application No. 13/748,862, filed on Jan. 24, 2013, now Pat. No. 9,399,418.

(51) Int. Cl.
*B60N 2/62* (2006.01)
*B60N 2/06* (2006.01)
(Continued)

(52) U.S. Cl.
CPC .............. *B60N 2/62* (2013.01); *B60N 2/0284* (2013.01); *B60N 2/443* (2013.01); *B60N 2/4435* (2013.01);
(Continued)

(58) Field of Classification Search
CPC ........ B60N 2/62; B60N 2/063; B60N 2/0284; B60N 2/4495
See application file for complete search history.

(56) References Cited

U.S. PATENT DOCUMENTS 616,178 A 12/1898 Barron
771,773 A 10/1904 Feely
(Continued)

FOREIGN PATENT DOCUMENTS

CN 201650491 U 11/2010
CN 203097995 U 7/2013
(Continued)

OTHER PUBLICATIONS

Matthew W Ing, United States Patent and Trademark Office, Non Final Office Communication re U.S. Appl. No. 13/749,561, Oct. 16, 2015, 33 pages.
(Continued)

*Primary Examiner* — Timothy J Brindley
(74) *Attorney, Agent, or Firm* — Vichit Chea; Price Heneveld LLP

(57) ABSTRACT

A seating assembly includes a seat frame. A first leg support is pivotally coupled with a forward portion of the seat frame. The first leg support is operable between raised and lowered positions. A first extendable member is disposed on a top portion of the first leg support and is operable between extended and retracted positions. A second leg support is adjacent to and independent of the first leg support and is pivotally coupled with the forward portion of the seat frame.
(Continued)

The second leg support is operable between raised and lowered positions. A second extendable member is disposed on a top portion of the second leg support and is operable between extended and retracted positions.

20 Claims, 12 Drawing Sheets

(51) Int. Cl.
  *B60N 2/44* (2006.01)
  *B60N 2/02* (2006.01)
(52) U.S. Cl.
  CPC .... *B60N 2/4495* (2013.01); *B60N 2002/4425* (2013.01); *B60N 2205/30* (2013.01); *B60N 2205/35* (2013.01)

(56) References Cited

U.S. PATENT DOCUMENTS

| | | |
|---|---|---|
| 1,125,155 A | 1/1915 | Nunn |
| 2,272,505 A | 2/1942 | Biggs |
| 2,661,050 A | 12/1953 | Felter |
| 2,725,921 A | 12/1955 | Markin |
| 2,834,606 A | 5/1958 | Bertrand |
| 2,938,570 A | 5/1960 | Flajole |
| 2,958,369 A | 11/1960 | Pitts et al. |
| 3,007,738 A | 11/1961 | Gardel et al. |
| 3,018,133 A | 1/1962 | Mills |
| 3,273,877 A | 9/1966 | Geller et al. |
| 3,330,598 A | 7/1967 | Whiteside |
| 3,403,938 A | 10/1968 | Cramer et al. |
| 3,481,327 A | 12/1969 | Drennen |
| 3,512,605 A | 5/1970 | McCorkle |
| 3,520,327 A | 7/1970 | Claydon et al. |
| 3,550,953 A | 12/1970 | Neale |
| 3,592,508 A | 7/1971 | Druseikis |
| 3,612,607 A | 10/1971 | Lohr |
| 3,632,166 A | 1/1972 | Lohr |
| 3,663,057 A | 5/1972 | Lohr et al. |
| 3,669,492 A | 6/1972 | Peterson |
| 3,773,382 A * | 11/1973 | Coursault .............. B60N 2/028 297/284.9 |
| 3,779,577 A | 12/1973 | Wilfert |
| 3,792,897 A | 2/1974 | Alson |
| 3,795,021 A | 3/1974 | Moniot |
| 3,813,151 A | 5/1974 | Cadiou |
| 3,833,257 A | 9/1974 | Dove |
| 3,877,749 A | 4/1975 | Sakurai et al. |
| 3,880,462 A | 4/1975 | Mednick |
| 3,883,173 A | 5/1975 | Shephard et al. |
| 3,885,831 A | 5/1975 | Rasmussen |
| 3,915,421 A | 10/1975 | Le Forestier |
| 3,929,374 A | 12/1975 | Hogan et al. |
| 4,017,118 A | 4/1977 | Cawley |
| 4,018,477 A | 4/1977 | Hogan |
| 4,058,342 A | 11/1977 | Ettridge |
| 4,115,170 A | 9/1978 | Sanson |
| 4,190,286 A | 2/1980 | Bentley |
| 4,205,877 A | 6/1980 | Ettridge |
| 4,225,989 A | 10/1980 | Corbett et al. |
| 4,306,322 A | 12/1981 | Young et al. |
| 4,324,431 A | 4/1982 | Murphy et al. |
| 4,334,709 A * | 6/1982 | Akiyama ............... B60N 2/62 297/284.11 |
| 4,353,595 A | 10/1982 | Kaneko et al. |
| 4,366,985 A | 1/1983 | Leffler |
| 4,415,203 A | 11/1983 | Cawley |
| 4,440,443 A | 4/1984 | Nordskog |
| 4,444,430 A | 4/1984 | Yoshida et al. |
| 4,452,485 A | 6/1984 | Schuster |
| 4,467,484 A | 8/1984 | Nagatake et al. |
| 4,491,364 A | 1/1985 | Hattori et al. |
| 4,491,365 A | 1/1985 | Murakami |
| 4,518,201 A | 5/1985 | Wahlmann et al. |
| 4,522,445 A | 6/1985 | Göldner et al. |
| 4,541,669 A * | 9/1985 | Goldner ................ B60N 2/62 297/284.11 |
| 4,580,837 A | 4/1986 | Bayley |
| 4,583,255 A | 4/1986 | Mogaki et al. |
| 4,583,781 A | 4/1986 | Hatsutta et al. |
| 4,592,588 A | 6/1986 | Isono et al. |
| 4,609,221 A | 9/1986 | Böttcher |
| 4,616,676 A | 10/1986 | Adams et al. |
| 4,616,874 A | 10/1986 | Pietsch et al. |
| 4,629,248 A | 12/1986 | Mawbey |
| 4,629,253 A | 12/1986 | Williams |
| 4,634,179 A | 1/1987 | Hashimoto et al. |
| 4,655,505 A | 4/1987 | Kashiwamura et al. |
| 4,664,444 A | 5/1987 | Murphy |
| 4,668,014 A | 5/1987 | Boisset |
| 4,693,513 A | 9/1987 | Heath |
| 4,707,027 A | 11/1987 | Horvath et al. |
| 4,711,497 A | 12/1987 | Kazaoka et al. |
| 4,718,723 A | 1/1988 | Bottemiller |
| 4,720,141 A | 1/1988 | Sakamoto et al. |
| 4,720,146 A | 1/1988 | Mawbey et al. |
| 4,726,086 A | 2/1988 | McEvoy |
| 4,752,982 A | 6/1988 | Jones et al. |
| 4,753,479 A | 6/1988 | Hatsutta et al. |
| 4,767,155 A | 8/1988 | Kousaka et al. |
| 4,773,703 A | 9/1988 | Krügener et al. |
| 4,775,185 A | 10/1988 | Scholin et al. |
| 4,781,413 A | 11/1988 | Shumack, Jr. |
| 4,790,592 A | 12/1988 | Busso et al. |
| 4,792,186 A | 12/1988 | Benjamin et al. |
| 4,796,313 A | 1/1989 | DiMatteo et al. |
| 4,822,092 A | 4/1989 | Sweers |
| 4,833,614 A | 5/1989 | Saitoh et al. |
| 4,840,429 A | 6/1989 | Stöckl |
| 4,856,844 A | 8/1989 | Isono |
| 4,858,992 A | 8/1989 | LaSota |
| 4,861,104 A | 8/1989 | Malak |
| 4,884,843 A | 12/1989 | DeRees |
| 4,893,367 A | 1/1990 | Heimreid et al. |
| 4,915,447 A | 4/1990 | Shovar |
| 4,938,529 A | 7/1990 | Fourrey |
| 4,965,899 A | 10/1990 | Sekido et al. |
| 4,966,410 A | 10/1990 | Bishai |
| 4,971,380 A | 11/1990 | Cote et al. |
| 5,013,089 A | 5/1991 | Abu-Isa et al. |
| 5,018,790 A | 5/1991 | Jay |
| 5,020,852 A | 6/1991 | Marion |
| 5,050,930 A | 9/1991 | Schuster et al. |
| 5,054,845 A | 10/1991 | Vogel |
| 5,054,856 A | 10/1991 | Wang |
| 5,067,772 A | 11/1991 | Koa |
| 5,082,326 A | 1/1992 | Sekido et al. |
| 5,096,529 A | 3/1992 | Baker |
| 5,104,189 A | 4/1992 | Hanai et al. |
| 5,108,150 A | 4/1992 | Stas et al. |
| 5,112,018 A | 5/1992 | Wahls |
| 5,120,109 A | 6/1992 | Rangoni |
| 5,127,708 A | 7/1992 | Kishi et al. |
| 5,129,704 A | 7/1992 | Kishi et al. |
| 5,145,232 A | 9/1992 | Dal Monte |
| 5,171,062 A | 12/1992 | Courtois |
| 5,174,526 A | 12/1992 | Kanigowski |
| 5,186,494 A | 2/1993 | Shimose |
| 5,190,348 A | 3/1993 | Colasanti |
| 5,203,608 A | 4/1993 | Tame |
| 5,222,784 A | 6/1993 | Hamelin |
| 5,243,722 A | 9/1993 | Gusakov |
| 5,263,765 A | 11/1993 | Nagashima et al. |
| 5,285,754 A | 2/1994 | Bell |
| 5,318,344 A | 6/1994 | Wang |
| 5,320,409 A | 6/1994 | Katoh et al. |
| 5,323,740 A | 6/1994 | Daily et al. |
| 5,364,164 A | 11/1994 | Kuranami |
| 5,370,443 A | 12/1994 | Maruyama |
| 5,375,569 A | 12/1994 | Santella |
| 5,380,063 A | 1/1995 | Dauphin |
| 5,443,303 A | 8/1995 | Bauer et al. |

(56) References Cited

U.S. PATENT DOCUMENTS

| | | | |
|---|---|---|---|
| 5,458,365 A | 10/1995 | Rogers et al. | |
| 5,518,294 A | 5/1996 | Ligon, Sr. et al. | |
| 5,544,942 A | 8/1996 | Vu Khac et al. | |
| 5,547,214 A | 8/1996 | Zimmerman, II et al. | |
| 5,560,681 A | 10/1996 | Dixon et al. | |
| 5,570,716 A | 11/1996 | Kamen et al. | |
| 5,588,708 A | 12/1996 | Rykken et al. | |
| 5,597,203 A * | 1/1997 | Hubbard | A47C 7/024 297/284.1 |
| 5,609,394 A | 3/1997 | Ligon, Sr. et al. | |
| 5,647,635 A | 7/1997 | Aumond et al. | |
| 5,658,050 A | 8/1997 | Lorbiecki | |
| 5,662,384 A | 9/1997 | O'Neill et al. | |
| 5,678,891 A | 10/1997 | O'Neill et al. | |
| 5,681,084 A | 10/1997 | Yoneda | |
| 5,690,387 A | 11/1997 | Sarti | |
| 5,692,802 A | 12/1997 | Aufrere et al. | |
| 5,707,109 A | 1/1998 | Massara et al. | |
| 5,738,368 A | 4/1998 | Hammond et al. | |
| 5,755,493 A * | 5/1998 | Kodaverdian | B60N 2/0228 297/362.14 |
| 5,758,924 A | 6/1998 | Vishey | |
| 5,769,489 A | 6/1998 | Dellanno | |
| 5,772,280 A | 6/1998 | Massara | |
| 5,775,778 A | 7/1998 | Riley et al. | |
| 5,785,669 A | 7/1998 | Proctor et al. | |
| 5,799,971 A | 9/1998 | Asada | |
| 5,803,490 A | 9/1998 | Seventko et al. | |
| 5,815,393 A | 9/1998 | Chae | |
| 5,823,620 A | 10/1998 | Le Caz | |
| 5,826,938 A | 10/1998 | Yanase et al. | |
| 5,836,648 A | 11/1998 | Karschin et al. | |
| 5,860,699 A | 1/1999 | Weeks | |
| 5,863,092 A | 1/1999 | Kifer | |
| 5,868,450 A | 2/1999 | Hashimoto | |
| 5,882,073 A | 3/1999 | Burchi et al. | |
| 5,893,609 A | 4/1999 | Schmidt | |
| 5,895,070 A | 4/1999 | Lachat | |
| 5,902,014 A | 5/1999 | Dinkel et al. | |
| 5,906,586 A | 5/1999 | Graham | |
| 5,913,568 A | 6/1999 | Brightbill et al. | |
| 5,944,341 A | 8/1999 | Kimura et al. | |
| 5,951,039 A | 9/1999 | Severinski et al. | |
| 5,967,608 A | 10/1999 | Van Sickle | |
| 5,975,629 A | 11/1999 | Lorbiecki | |
| 5,975,637 A | 11/1999 | Geuss et al. | |
| 5,979,985 A | 11/1999 | Bauer et al. | |
| 5,983,940 A | 11/1999 | Smith | |
| 5,988,674 A | 11/1999 | Kimura et al. | |
| 6,019,387 A | 2/2000 | Jost | |
| 6,024,378 A | 2/2000 | Fu | |
| 6,024,406 A | 2/2000 | Charras et al. | |
| 6,030,040 A | 2/2000 | Schmid et al. | |
| 6,050,635 A | 4/2000 | Pajon et al. | |
| 6,056,366 A | 5/2000 | Haynes et al. | |
| 6,062,642 A | 5/2000 | Sinnhuber et al. | |
| 6,068,339 A | 5/2000 | Linzalone | |
| 6,079,781 A | 6/2000 | Tilley | |
| 6,088,642 A | 7/2000 | Finkelstein et al. | |
| 6,106,071 A | 8/2000 | Aebischer et al. | |
| 6,106,163 A | 8/2000 | Inana et al. | |
| 6,109,690 A | 8/2000 | Wu et al. | |
| 6,145,925 A | 11/2000 | Eksin et al. | |
| 6,155,593 A | 12/2000 | Kimura et al. | |
| 6,158,812 A | 12/2000 | Bonke | |
| 6,161,231 A | 12/2000 | Kraft et al. | |
| 6,179,379 B1 | 1/2001 | Andersson | |
| 6,189,966 B1 | 2/2001 | Faust et al. | |
| 6,196,627 B1 | 3/2001 | Faust et al. | |
| 6,199,252 B1 | 3/2001 | Masters et al. | |
| 6,199,900 B1 | 3/2001 | Zeigler | |
| 6,199,951 B1 | 3/2001 | Zeile et al. | |
| 6,203,105 B1 | 3/2001 | Rhodes, Jr. | |
| 6,206,466 B1 | 3/2001 | Komatsu | |
| 6,217,062 B1 | 4/2001 | Breyvogel et al. | |
| 6,217,118 B1 | 4/2001 | Heilig | |
| 6,220,661 B1 | 4/2001 | Peterson | |
| 6,224,150 B1 | 5/2001 | Eksin et al. | |
| 6,231,068 B1 | 5/2001 | White, Jr. et al. | |
| 6,234,518 B1 | 5/2001 | Ryl et al. | |
| 6,273,810 B1 | 8/2001 | Rhodes, Jr. et al. | |
| 6,296,308 B1 | 10/2001 | Cosentino et al. | |
| 6,302,431 B1 | 10/2001 | Sasaki et al. | |
| 6,312,050 B1 | 11/2001 | Eklind | |
| 6,341,797 B1 | 1/2002 | Seo | |
| 6,349,993 B1 | 2/2002 | Walsh | |
| 6,352,304 B1 | 3/2002 | Sorgenfrei | |
| 6,352,310 B1 | 3/2002 | Schmidt et al. | |
| 6,357,066 B1 | 3/2002 | Pierce | |
| 6,357,789 B1 | 3/2002 | Harada et al. | |
| 6,357,827 B1 | 3/2002 | Brightbill et al. | |
| 6,364,414 B1 | 4/2002 | Specht | |
| 6,375,269 B1 | 4/2002 | Maeda et al. | |
| 6,382,720 B1 | 5/2002 | Franklin et al. | |
| 6,386,577 B1 | 5/2002 | Kan et al. | |
| 6,390,557 B1 | 5/2002 | Asano | |
| 6,394,525 B1 | 5/2002 | Seibold | |
| 6,394,546 B1 | 5/2002 | Knoblock et al. | |
| 6,398,299 B1 | 6/2002 | Angerer et al. | |
| 6,398,306 B1 | 6/2002 | Mack | |
| 6,419,317 B1 | 7/2002 | Westrich et al. | |
| 6,425,602 B1 | 7/2002 | Al-Amin et al. | |
| 6,431,734 B1 | 8/2002 | Curry | |
| 6,439,597 B1 | 8/2002 | Harada et al. | |
| 6,450,571 B1 | 9/2002 | Canni et al. | |
| 6,454,353 B1 * | 9/2002 | Knaus | A47C 31/02 297/284.11 |
| 6,457,741 B2 | 10/2002 | Seki et al. | |
| 6,474,733 B1 | 11/2002 | Heilig et al. | |
| 6,523,892 B1 | 2/2003 | Kage et al. | |
| 6,523,902 B2 | 2/2003 | Robinson | |
| 6,530,622 B1 | 3/2003 | Ekern et al. | |
| 6,550,856 B1 | 4/2003 | Ganser et al. | |
| 6,554,365 B2 | 4/2003 | Karschin et al. | |
| 6,557,887 B2 | 5/2003 | Wohllebe | |
| 6,561,540 B1 | 5/2003 | Hasegawa et al. | |
| 6,565,150 B2 | 5/2003 | Fischer et al. | |
| 6,565,153 B2 | 5/2003 | Hensel et al. | |
| 6,568,754 B1 | 5/2003 | Norton et al. | |
| 6,578,911 B2 | 6/2003 | Harada et al. | |
| 6,588,838 B1 | 7/2003 | Dick, Jr. et al. | |
| 6,612,610 B1 | 9/2003 | Aoki et al. | |
| 6,616,177 B2 | 9/2003 | Thomas et al. | |
| 6,619,605 B2 | 9/2003 | Lambert | |
| 6,619,737 B2 | 9/2003 | Kunkel et al. | |
| 6,629,715 B2 | 10/2003 | Oh et al. | |
| 6,637,818 B2 | 10/2003 | Williams | |
| 6,672,666 B2 | 1/2004 | Stiller et al. | |
| 6,682,059 B1 | 1/2004 | Daniels et al. | |
| 6,682,140 B2 | 1/2004 | Minuth et al. | |
| 6,695,406 B2 | 2/2004 | Plant | |
| 6,698,832 B2 | 3/2004 | Boudinot | |
| 6,719,373 B2 | 4/2004 | Zimmermann | |
| 6,726,280 B1 | 4/2004 | Liao | |
| 6,733,064 B2 | 5/2004 | Fox et al. | |
| 6,736,452 B2 | 5/2004 | Aoki et al. | |
| 6,746,077 B2 | 6/2004 | Klukowski | |
| 6,758,522 B2 | 7/2004 | Ligon, Sr. et al. | |
| 6,779,560 B1 | 8/2004 | Reis | |
| 6,786,542 B1 | 9/2004 | Nuzzarello | |
| 6,802,563 B1 | 10/2004 | Mysliwiec et al. | |
| 6,808,230 B2 | 10/2004 | Buss et al. | |
| 6,811,219 B2 | 11/2004 | Hudswell et al. | |
| 6,820,640 B2 | 11/2004 | Hand et al. | |
| 6,820,930 B2 | 11/2004 | Dellanno | |
| 6,824,212 B2 | 11/2004 | Malsch et al. | |
| 6,848,742 B2 | 2/2005 | Aoki et al. | |
| 6,854,869 B2 | 2/2005 | Fernandez | |
| 6,860,559 B2 | 3/2005 | Schuster, Sr. et al. | |
| 6,860,564 B2 | 3/2005 | Reed et al. | |
| 6,866,339 B2 | 3/2005 | Itoh | |
| 6,869,140 B2 | 3/2005 | White et al. | |
| 6,890,029 B2 | 5/2005 | Svantesson | |
| 6,890,030 B2 | 5/2005 | Wilkerson et al. | |

(56) References Cited

U.S. PATENT DOCUMENTS

| | | | |
|---|---|---|---|
| 6,899,399 B2 | 5/2005 | Ali et al. | |
| 6,908,151 B2 | 6/2005 | Meeker et al. | |
| 6,912,748 B2 | 7/2005 | VanSickle | |
| 6,938,953 B2 | 9/2005 | Håland et al. | |
| 6,955,399 B2 | 10/2005 | Hong | |
| 6,962,392 B2 | 11/2005 | O'Connor | |
| 6,988,770 B2 | 1/2006 | Witchie | |
| 6,991,256 B2 | 1/2006 | Henderson et al. | |
| 6,991,289 B2 | 1/2006 | House | |
| 6,997,473 B2 | 2/2006 | Tanase et al. | |
| 7,025,423 B2 | 4/2006 | Fujita et al. | |
| 7,040,699 B2 | 5/2006 | Curran et al. | |
| 7,055,904 B2 * | 6/2006 | Skelly | A47C 7/503 297/284.11 |
| 7,059,678 B1 | 6/2006 | Taylor | |
| 7,072,764 B2 | 7/2006 | Donath et al. | |
| 7,093,898 B2 | 8/2006 | Ladron De Guevara | |
| 7,100,978 B2 | 9/2006 | Ekern et al. | |
| 7,100,992 B2 | 9/2006 | Bargheer et al. | |
| 7,108,322 B2 | 9/2006 | Erker | |
| 7,111,901 B2 | 9/2006 | Schlierf et al. | |
| 7,125,077 B2 | 10/2006 | Frank | |
| 7,131,694 B1 | 11/2006 | Buffa | |
| 7,131,695 B2 * | 11/2006 | Hofschulte | B60N 2/0232 297/284.11 |
| 7,131,756 B2 | 11/2006 | Leslie et al. | |
| 7,134,686 B2 | 11/2006 | Tracht et al. | |
| 7,140,682 B2 | 11/2006 | Jaeger et al. | |
| 7,152,920 B2 | 12/2006 | Sugiyama et al. | |
| 7,159,934 B2 | 1/2007 | Farquhar et al. | |
| 7,159,938 B1 | 1/2007 | Shiraishi | |
| 7,185,950 B2 | 3/2007 | Pettersson et al. | |
| 7,195,274 B2 | 3/2007 | Tracht | |
| 7,195,277 B2 | 3/2007 | Tracht et al. | |
| 7,213,876 B2 | 5/2007 | Stoewe | |
| 7,213,883 B2 | 5/2007 | Charnitski | |
| 7,216,915 B2 | 5/2007 | Kämmerer et al. | |
| 7,229,118 B2 | 6/2007 | Saberan et al. | |
| 7,229,129 B2 | 6/2007 | White et al. | |
| 7,234,771 B2 | 6/2007 | Nakhla | |
| 7,261,371 B2 | 8/2007 | Thunissen et al. | |
| 7,267,363 B2 | 9/2007 | Tredez | |
| 7,284,768 B2 | 10/2007 | Tracht | |
| 7,290,791 B2 | 11/2007 | Tracht | |
| 7,293,831 B2 | 11/2007 | Greene | |
| 7,311,681 B1 | 12/2007 | Vaccarella | |
| 7,316,215 B1 | 1/2008 | Nino et al. | |
| 7,322,651 B2 | 1/2008 | Makhsous et al. | |
| 7,325,878 B1 | 2/2008 | Dehli | |
| 7,341,309 B2 | 3/2008 | Penley et al. | |
| 7,344,189 B2 | 3/2008 | Reed et al. | |
| 7,347,444 B2 | 3/2008 | Wheelwright | |
| 7,350,803 B2 | 4/2008 | Abramczyk et al. | |
| 7,350,859 B2 | 4/2008 | Klukowski | |
| 7,350,865 B2 | 4/2008 | Pearse | |
| 7,357,412 B2 | 4/2008 | Tracht et al. | |
| 7,357,454 B2 | 4/2008 | Schiener et al. | |
| 7,382,240 B2 | 6/2008 | Egelhaaf | |
| 7,387,339 B2 | 6/2008 | Bykov et al. | |
| 7,393,005 B2 | 7/2008 | Inazu et al. | |
| 7,401,852 B2 | 7/2008 | Humer et al. | |
| 7,413,253 B2 | 8/2008 | Karlberg | |
| 7,425,034 B2 | 9/2008 | Bajic et al. | |
| 7,441,797 B2 | 10/2008 | Tracht et al. | |
| 7,441,838 B2 | 10/2008 | Patwardhan | |
| 7,445,292 B2 | 11/2008 | Moule | |
| 7,467,823 B2 | 12/2008 | Hartwich | |
| 7,478,869 B2 | 1/2009 | Lazanja et al. | |
| 7,481,489 B2 | 1/2009 | Demick | |
| 7,488,040 B2 | 2/2009 | Dozsa-Farkas | |
| 7,506,924 B2 | 3/2009 | Bargheer et al. | |
| 7,506,938 B2 | 3/2009 | Brennan et al. | |
| 7,517,015 B2 | 4/2009 | Terada et al. | |
| 7,517,024 B2 | 4/2009 | Cvek | |
| 7,523,888 B2 | 4/2009 | Ferry et al. | |
| 7,530,633 B2 | 5/2009 | Yokota et al. | |
| 7,540,529 B2 | 6/2009 | Tracht et al. | |
| 7,543,888 B2 | 6/2009 | Kuno | |
| 7,547,068 B2 | 6/2009 | Davis | |
| 7,562,934 B2 | 7/2009 | Swan et al. | |
| 7,578,552 B2 | 8/2009 | Bajic et al. | |
| 7,578,554 B2 | 8/2009 | Lee et al. | |
| 7,597,398 B2 | 10/2009 | Lindsay | |
| 7,604,294 B2 | 10/2009 | Santamaria | |
| 7,611,199 B2 | 11/2009 | Michalak et al. | |
| 7,614,693 B2 * | 11/2009 | Ito | B60N 2/0284 297/284.11 |
| 7,628,455 B2 * | 12/2009 | Brodeur | A47C 7/024 297/284.9 |
| 7,637,568 B2 | 12/2009 | Meeker et al. | |
| 7,640,090 B2 | 12/2009 | Uchida et al. | |
| 7,641,281 B2 | 1/2010 | Grimm | |
| 7,668,329 B2 | 2/2010 | Matsuhashi | |
| 7,669,888 B2 | 3/2010 | Sato et al. | |
| 7,669,925 B2 | 3/2010 | Beck et al. | |
| 7,669,928 B2 | 3/2010 | Snyder | |
| 7,669,929 B2 | 3/2010 | Simon et al. | |
| 7,677,594 B2 | 3/2010 | Hazlewood et al. | |
| 7,677,598 B1 | 3/2010 | Ryan et al. | |
| 7,699,339 B2 | 4/2010 | Jang et al. | |
| 7,712,833 B2 | 5/2010 | Ueda | |
| 7,717,459 B2 | 5/2010 | Bostrom et al. | |
| 7,726,733 B2 | 6/2010 | Balser et al. | |
| 7,735,932 B2 | 6/2010 | Lazanja et al. | |
| 7,752,720 B2 | 7/2010 | Smith | |
| 7,753,451 B2 | 7/2010 | Maebert et al. | |
| 7,775,552 B2 | 8/2010 | Breuninger et al. | |
| 7,775,602 B2 | 8/2010 | Lazanja et al. | |
| 7,784,819 B2 | 8/2010 | Lawall et al. | |
| 7,784,863 B2 | 8/2010 | Fallen | |
| 7,793,973 B2 | 9/2010 | Sato et al. | |
| 7,794,012 B2 | 9/2010 | Szablewski | |
| 7,798,570 B2 | 9/2010 | Kwiecinski et al. | |
| 7,802,809 B2 | 9/2010 | Ryan et al. | |
| 7,802,843 B2 | 9/2010 | Andersson et al. | |
| 7,810,969 B2 | 10/2010 | Blackmore et al. | |
| 7,819,470 B2 | 10/2010 | Humer et al. | |
| 7,819,480 B2 | 10/2010 | Asbury et al. | |
| 7,823,971 B2 | 11/2010 | Humer et al. | |
| 7,845,729 B2 | 12/2010 | Yamada et al. | |
| 7,850,235 B2 | 12/2010 | Veine et al. | |
| 7,850,247 B2 | 12/2010 | Stauske et al. | |
| 7,857,381 B2 | 12/2010 | Humer et al. | |
| 7,862,113 B2 | 1/2011 | Knoll | |
| 7,862,117 B2 | 1/2011 | Hutchinson et al. | |
| 7,866,689 B2 | 1/2011 | Saberan | |
| 7,871,126 B2 | 1/2011 | Becker et al. | |
| 7,871,129 B2 | 1/2011 | Boes et al. | |
| 7,878,535 B2 | 2/2011 | Rose et al. | |
| 7,878,596 B2 | 2/2011 | Brunner et al. | |
| 7,887,094 B2 | 2/2011 | Sakaida | |
| 7,891,701 B2 | 2/2011 | Tracht et al. | |
| 7,909,360 B2 | 3/2011 | Marriott et al. | |
| 7,909,401 B2 | 3/2011 | Hofmann et al. | |
| 7,909,403 B2 | 3/2011 | Lawall et al. | |
| 7,926,871 B2 | 4/2011 | Meixner et al. | |
| 7,926,872 B2 | 4/2011 | Chida et al. | |
| 7,931,294 B2 | 4/2011 | Okada et al. | |
| 7,931,330 B2 | 4/2011 | Itou et al. | |
| 7,938,440 B2 | 5/2011 | Kataoka et al. | |
| 7,946,649 B2 | 5/2011 | Galbreath et al. | |
| 7,959,225 B2 | 6/2011 | Humer et al. | |
| 7,959,226 B2 | 6/2011 | Hattori et al. | |
| 7,963,553 B2 | 6/2011 | Huynh et al. | |
| 7,963,595 B2 | 6/2011 | Ito et al. | |
| 7,963,600 B2 | 6/2011 | Alexander et al. | |
| 7,966,835 B2 | 6/2011 | Petrovski | |
| 7,967,379 B2 | 6/2011 | Walters et al. | |
| 7,971,931 B2 | 7/2011 | Lazanja et al. | |
| 7,971,937 B2 | 7/2011 | Ishii et al. | |
| 8,011,726 B2 | 9/2011 | Omori et al. | |
| 8,011,728 B2 | 9/2011 | Kohl et al. | |
| 8,016,355 B2 * | 9/2011 | Ito | B60N 2/0284 297/284.11 |

(56) References Cited

U.S. PATENT DOCUMENTS

| | | | |
|---|---|---|---|
| 8,029,055 B2 | 10/2011 | Hartlaub | |
| 8,038,222 B2 | 10/2011 | Lein et al. | |
| 8,056,923 B2 | 11/2011 | Shimono | |
| 8,075,053 B2 | 12/2011 | Tracht et al. | |
| 8,100,471 B2 | 1/2012 | Lawall et al. | |
| 8,109,569 B2 | 2/2012 | Mitchell | |
| 8,111,147 B2 | 2/2012 | Litkouhi | |
| 8,113,539 B2 | 2/2012 | Paruszkiewicz et al. | |
| 8,123,246 B2 | 2/2012 | Gilbert et al. | |
| 8,126,615 B2 | 2/2012 | McMillen et al. | |
| D655,393 S | 3/2012 | Whitaker | |
| 8,128,167 B2 | 3/2012 | Zhong et al. | |
| 8,141,945 B2 | 3/2012 | Akaike et al. | |
| 8,162,391 B2 | 4/2012 | Lazanja et al. | |
| 8,162,392 B2 | 4/2012 | Humer et al. | |
| 8,162,397 B2* | 4/2012 | Booth | B60N 2/0284 297/284.11 |
| 8,167,370 B2 | 5/2012 | Arakawa et al. | |
| 8,167,376 B2 | 5/2012 | Song | |
| 8,177,256 B2 | 5/2012 | Smith et al. | |
| 8,196,887 B2 | 6/2012 | Dahlbacka et al. | |
| 8,201,883 B2 | 6/2012 | Wuerstlein et al. | |
| 8,210,568 B2 | 7/2012 | Ryden et al. | |
| 8,210,605 B2 | 7/2012 | Hough et al. | |
| 8,210,611 B2 | 7/2012 | Aldrich et al. | |
| 8,226,113 B2 | 7/2012 | Yamashita | |
| 8,226,165 B2 | 7/2012 | Mizoi | |
| 8,231,138 B2 | 7/2012 | Sadr et al. | |
| 8,240,758 B2 | 8/2012 | Combest | |
| 8,251,396 B2 | 8/2012 | Zothke et al. | |
| 8,297,708 B2 | 10/2012 | Mizobata et al. | |
| 8,328,227 B2 | 12/2012 | Shimono | |
| 8,328,231 B2 | 12/2012 | Nakamura et al. | |
| 8,336,910 B1 | 12/2012 | Kalisz et al. | |
| 8,342,607 B2 | 1/2013 | Hofmann et al. | |
| 8,348,338 B2 | 1/2013 | Galecka et al. | |
| 8,360,517 B2 | 1/2013 | Lazanja et al. | |
| 8,360,530 B2 | 1/2013 | Onoda et al. | |
| 8,371,655 B2 | 2/2013 | Nonomiya | |
| 8,388,061 B2 | 3/2013 | Saito et al. | |
| 8,397,688 B2 | 3/2013 | Cunningham | |
| 8,403,410 B1 | 3/2013 | Pinger et al. | |
| 8,408,646 B2 | 4/2013 | Harper et al. | |
| 8,447,473 B2 | 5/2013 | Sugiyama et al. | |
| 8,469,395 B2 | 6/2013 | Richez et al. | |
| 8,474,778 B2 | 7/2013 | Jacobson | |
| 8,474,917 B2 | 7/2013 | Line et al. | |
| 8,511,748 B2 | 8/2013 | McLeod et al. | |
| 8,516,842 B2 | 8/2013 | Petrovski | |
| 8,534,760 B2 | 9/2013 | Kotz | |
| 8,540,318 B2 | 9/2013 | Folkert et al. | |
| 8,585,144 B2 | 11/2013 | Huttenhuis | |
| 8,590,978 B2 | 11/2013 | Jaranson et al. | |
| 8,602,493 B1 | 12/2013 | Chen et al. | |
| 8,657,378 B2 | 2/2014 | Kunert et al. | |
| 8,678,500 B2 | 3/2014 | Lem et al. | |
| 8,696,067 B2 | 4/2014 | Galbreath et al. | |
| 8,727,374 B1 | 5/2014 | Line et al. | |
| 8,752,894 B2 | 6/2014 | Trimborn et al. | |
| 8,794,707 B2 | 8/2014 | Bocsanyi et al. | |
| 8,807,594 B2 | 8/2014 | Mizobata | |
| 8,827,371 B2 | 9/2014 | Brncick et al. | |
| 8,899,683 B2 | 12/2014 | Ito | |
| 8,905,431 B2 | 12/2014 | Line et al. | |
| 8,967,663 B2 | 3/2015 | Seki et al. | |
| 8,979,204 B2 | 3/2015 | Awata et al. | |
| 9,016,784 B2* | 4/2015 | Line | B60N 2/0284 297/284.11 |
| 9,096,157 B2 | 8/2015 | Line et al. | |
| 9,126,504 B2 | 9/2015 | Line et al. | |
| 9,126,508 B2 | 9/2015 | Line et al. | |
| 9,132,753 B1* | 9/2015 | Campbell | B60N 2/42709 |
| 9,187,019 B2* | 11/2015 | Dry | B60N 2/62 |
| 9,193,289 B2 | 11/2015 | Takahashi et al. | |
| 9,365,142 B1* | 6/2016 | Line | B60N 2/02 |
| 9,365,143 B2* | 6/2016 | Sachs | B60N 2/62 |
| 9,371,011 B2* | 6/2016 | Lee | B60N 2/62 |
| 2001/0011812 A1 | 8/2001 | Seki et al. | |
| 2002/0096915 A1 | 7/2002 | Haupt et al. | |
| 2002/0113473 A1 | 8/2002 | Knaus | |
| 2002/0145512 A1 | 10/2002 | Sleichter, III et al. | |
| 2003/0023363 A1 | 1/2003 | Katz et al. | |
| 2003/0025370 A1 | 2/2003 | Hensel et al. | |
| 2003/0038517 A1 | 2/2003 | Moran et al. | |
| 2003/0137178 A1 | 7/2003 | Craft et al. | |
| 2003/0213105 A1 | 11/2003 | Bednarski | |
| 2004/0012237 A1 | 1/2004 | Horiki et al. | |
| 2004/0084937 A1 | 5/2004 | Berta | |
| 2004/0108760 A1 | 6/2004 | McMillen | |
| 2004/0129585 A1 | 7/2004 | Ballantine et al. | |
| 2004/0144349 A1 | 7/2004 | Wampula et al. | |
| 2004/0183351 A1 | 9/2004 | Johnson et al. | |
| 2004/0195870 A1 | 10/2004 | Bohlender et al. | |
| 2004/0212589 A1 | 10/2004 | Hall et al. | |
| 2005/0029846 A1* | 2/2005 | Jonas | A47C 1/023 297/284.3 |
| 2005/0035642 A1 | 2/2005 | Hake et al. | |
| 2005/0077762 A1 | 4/2005 | Kraemer et al. | |
| 2005/0082895 A1 | 4/2005 | Kimmig | |
| 2005/0127734 A1 | 6/2005 | Veine et al. | |
| 2005/0140193 A1 | 6/2005 | Skelly et al. | |
| 2005/0179287 A1 | 8/2005 | Hankins | |
| 2005/0179291 A1 | 8/2005 | Brodeur | |
| 2005/0184569 A1 | 8/2005 | Penley et al. | |
| 2005/0189752 A1 | 9/2005 | Itoga et al. | |
| 2005/0200166 A1 | 9/2005 | Noh | |
| 2005/0248189 A1 | 11/2005 | Prasatek et al. | |
| 2005/0253429 A1 | 11/2005 | Veine et al. | |
| 2005/0258624 A1 | 11/2005 | Abraham et al. | |
| 2006/0043777 A1 | 3/2006 | Friedman et al. | |
| 2006/0113751 A1 | 6/2006 | Tracht et al. | |
| 2006/0113762 A1 | 6/2006 | Tracht et al. | |
| 2006/0113765 A1 | 6/2006 | Tracht | |
| 2006/0152062 A1 | 7/2006 | Archambault et al. | |
| 2006/0155429 A1 | 7/2006 | Boone et al. | |
| 2006/0214487 A1 | 9/2006 | Holdampf et al. | |
| 2006/0220434 A1 | 10/2006 | Schulz et al. | |
| 2006/0244301 A1 | 11/2006 | Jeffries | |
| 2007/0029853 A1 | 2/2007 | Forgatsch et al. | |
| 2007/0090673 A1 | 4/2007 | Ito | |
| 2007/0118259 A1 | 5/2007 | Chernoff et al. | |
| 2007/0120401 A1 | 5/2007 | Minuth et al. | |
| 2007/0138844 A1 | 6/2007 | Kim | |
| 2007/0170707 A1 | 7/2007 | Sato et al. | |
| 2007/0200398 A1 | 8/2007 | Wolas et al. | |
| 2007/0241593 A1 | 10/2007 | Woerner | |
| 2007/0296194 A1 | 12/2007 | Ridgway et al. | |
| 2008/0036258 A1 | 2/2008 | Holdampf et al. | |
| 2008/0067850 A1 | 3/2008 | Stenstrom et al. | |
| 2008/0122241 A1 | 5/2008 | Blackmore et al. | |
| 2008/0136240 A1 | 6/2008 | Matthews et al. | |
| 2008/0157577 A1 | 7/2008 | Lindsay | |
| 2008/0174159 A1 | 7/2008 | Kojima et al. | |
| 2008/0231099 A1* | 9/2008 | Szczepkowski | A47C 7/022 297/284.11 |
| 2008/0252111 A1 | 10/2008 | Rothkop et al. | |
| 2009/0039690 A1* | 2/2009 | Simon | B60N 2/0224 297/344.1 |
| 2009/0066122 A1 | 3/2009 | Minuth et al. | |
| 2009/0085383 A1 | 4/2009 | Hicks et al. | |
| 2009/0091172 A1* | 4/2009 | Kim | B60N 2/0284 297/337 |
| 2009/0102255 A1 | 4/2009 | D'Agostini et al. | |
| 2009/0152909 A1 | 6/2009 | Andersson | |
| 2009/0160167 A1 | 6/2009 | Itoga | |
| 2009/0165263 A1 | 7/2009 | Smith | |
| 2009/0195041 A1 | 8/2009 | Ito et al. | |
| 2009/0224584 A1 | 9/2009 | Lawall et al. | |
| 2009/0302660 A1 | 12/2009 | Karlberg et al. | |
| 2009/0315372 A1 | 12/2009 | Tracht | |
| 2009/0322124 A1 | 12/2009 | Barkow et al. | |
| 2010/0007122 A1 | 1/2010 | Clauser et al. | |
| 2010/0026066 A1 | 2/2010 | Graber et al. | |
| 2010/0038937 A1 | 2/2010 | Andersson et al. | |

(56) References Cited

U.S. PATENT DOCUMENTS

| | | |
|---|---|---|
| 2010/0102599 A1 | 4/2010 | Itou et al. |
| 2010/0109397 A1 | 5/2010 | Bandurksi et al. |
| 2010/0109401 A1 | 5/2010 | Booth et al. |
| 2010/0117414 A1 | 5/2010 | Hwang et al. |
| 2010/0133794 A1 | 6/2010 | Tracht et al. |
| 2010/0140986 A1 | 6/2010 | Sawada |
| 2010/0140992 A1 | 6/2010 | Yamaguchi |
| 2010/0148546 A1 | 6/2010 | Demontis et al. |
| 2010/0148948 A1 | 6/2010 | Murphy et al. |
| 2010/0171346 A1 | 7/2010 | Laframboise et al. |
| 2010/0187881 A1 | 7/2010 | Fujita et al. |
| 2010/0201167 A1 | 8/2010 | Wieclawski |
| 2010/0207438 A1 | 8/2010 | Inoue et al. |
| 2010/0207443 A1 | 8/2010 | Brncick |
| 2010/0231013 A1 | 9/2010 | Schlenker |
| 2010/0270840 A1 | 10/2010 | Tanaka et al. |
| 2010/0283229 A1 | 11/2010 | Feller et al. |
| 2010/0286867 A1 | 11/2010 | Bergholz et al. |
| 2010/0301650 A1 | 12/2010 | Hong |
| 2010/0319796 A1 | 12/2010 | Whitaker |
| 2010/0320816 A1 | 12/2010 | Michalak |
| 2010/0327636 A1 | 12/2010 | Stoll et al. |
| 2011/0018498 A1 | 1/2011 | Soar |
| 2011/0055720 A1 | 3/2011 | Potter et al. |
| 2011/0074185 A1 | 3/2011 | Nakaya et al. |
| 2011/0095513 A1 | 4/2011 | Tracht et al. |
| 2011/0095578 A1 | 4/2011 | Festag |
| 2011/0109127 A1 | 5/2011 | Park et al. |
| 2011/0109128 A1 | 5/2011 | Axakov et al. |
| 2011/0121624 A1 | 5/2011 | Brncick et al. |
| 2011/0133525 A1 | 6/2011 | Oota |
| 2011/0155084 A1 | 6/2011 | Sargeant |
| 2011/0163574 A1 | 7/2011 | Tame et al. |
| 2011/0163583 A1* | 7/2011 | Zhong .................. B60N 2/62 297/337 |
| 2011/0186560 A1 | 8/2011 | Kennedy et al. |
| 2011/0187174 A1 | 8/2011 | Tscherbner |
| 2011/0199200 A1 | 8/2011 | Lueke et al. |
| 2011/0215200 A1 | 9/2011 | Mejuhas |
| 2011/0248532 A1 | 10/2011 | Kim et al. |
| 2011/0248538 A1* | 10/2011 | Harper .................. B60N 2/02 297/311 |
| 2011/0254335 A1* | 10/2011 | Pradier ............. B60N 2/0232 297/284.11 |
| 2011/0260506 A1 | 10/2011 | Kuno |
| 2011/0260509 A1 | 10/2011 | Siu |
| 2011/0272548 A1 | 11/2011 | Rudkowski et al. |
| 2011/0272978 A1 | 11/2011 | Nitsuma |
| 2011/0278885 A1 | 11/2011 | Procter et al. |
| 2011/0278886 A1 | 11/2011 | Nitsuma |
| 2011/0285194 A1 | 11/2011 | Marom |
| 2011/0298261 A1 | 12/2011 | Holt et al. |
| 2011/0309604 A1 | 12/2011 | Moore et al. |
| 2012/0013161 A1 | 1/2012 | Adams et al. |
| 2012/0032478 A1 | 2/2012 | Friderich et al. |
| 2012/0032486 A1 | 2/2012 | Baker et al. |
| 2012/0037754 A1 | 2/2012 | Kladde |
| 2012/0041648 A1 | 2/2012 | Yamaguchi et al. |
| 2012/0043791 A1 | 2/2012 | Kojima |
| 2012/0049597 A1 | 3/2012 | Brewer et al. |
| 2012/0063081 A1 | 3/2012 | Grunwald |
| 2012/0080914 A1 | 4/2012 | Wang |
| 2012/0081234 A1 | 4/2012 | Shaffer et al. |
| 2012/0081544 A1 | 4/2012 | Wee |
| 2012/0091695 A1 | 4/2012 | Richez et al. |
| 2012/0091766 A1 | 4/2012 | Yamaki et al. |
| 2012/0091779 A1* | 4/2012 | Chang .................. B60N 3/063 297/423.3 |
| 2012/0109468 A1 | 5/2012 | Baumann et al. |
| 2012/0112515 A1 | 5/2012 | Labish |
| 2012/0119551 A1 | 5/2012 | Brncick et al. |
| 2012/0125959 A1 | 5/2012 | Kucera |
| 2012/0127643 A1 | 5/2012 | Mitchell |
| 2012/0129440 A1 | 5/2012 | Kitaguchi et al. |
| 2012/0161481 A1 | 6/2012 | Tache et al. |
| 2012/0162891 A1 | 6/2012 | Tranchina et al. |
| 2012/0167845 A1 | 7/2012 | Sands et al. |
| 2012/0175924 A1 | 7/2012 | Festag et al. |
| 2012/0187729 A1 | 7/2012 | Fukawatase et al. |
| 2012/0187731 A1 | 7/2012 | Guadagno |
| 2012/0222900 A1 | 9/2012 | Rodney et al. |
| 2012/0248833 A1 | 10/2012 | Hontz et al. |
| 2012/0248839 A1 | 10/2012 | Fujita et al. |
| 2012/0261974 A1 | 10/2012 | Yoshizawa et al. |
| 2012/0267878 A1 | 10/2012 | Kalisz et al. |
| 2012/0299342 A1 | 11/2012 | Mizobata |
| 2013/0015643 A1 | 1/2013 | Gorman et al. |
| 2013/0076092 A1 | 3/2013 | Kulkarni et al. |
| 2013/0119646 A1 | 5/2013 | Tracht |
| 2013/0119715 A1 | 5/2013 | Medoro et al. |
| 2013/0119723 A1 | 5/2013 | Nitsuma |
| 2013/0119724 A1 | 5/2013 | Adachi et al. |
| 2013/0119741 A1 | 5/2013 | Medoro et al. |
| 2013/0134749 A1 | 5/2013 | Awata et al. |
| 2013/0181492 A1 | 7/2013 | Prescott et al. |
| 2013/0220877 A1 | 8/2013 | Stern |
| 2013/0241255 A1 | 9/2013 | Kulkarni et al. |
| 2013/0257126 A1* | 10/2013 | Freisleben ........... B60N 2/0232 297/311 |
| 2013/0285426 A1 | 10/2013 | Arant et al. |
| 2013/0313882 A1* | 11/2013 | Yin .................. A47C 7/506 297/423.22 |
| 2013/0320730 A1 | 12/2013 | Aselage |
| 2013/0320742 A1 | 12/2013 | Murolo et al. |
| 2013/0341975 A1 | 12/2013 | Schneider et al. |
| 2013/0342366 A1 | 12/2013 | Kiefer et al. |
| 2013/0343072 A1 | 12/2013 | Ehrmann et al. |
| 2014/0032043 A1 | 1/2014 | Line et al. |
| 2014/0042781 A1 | 2/2014 | Reeves |
| 2014/0054944 A1 | 2/2014 | Locke et al. |
| 2014/0058305 A1 | 2/2014 | Batterson et al. |
| 2014/0062147 A1 | 3/2014 | Bashir et al. |
| 2014/0070594 A1 | 3/2014 | Awata et al. |
| 2014/0077565 A1 | 3/2014 | Baumgarten et al. |
| 2014/0135991 A1 | 5/2014 | Summer et al. |
| 2014/0139979 A1 | 5/2014 | Blazic |
| 2014/0152057 A1 | 6/2014 | Truant et al. |
| 2014/0167465 A1 | 6/2014 | Sakata et al. |
| 2014/0180181 A1 | 6/2014 | von Oepen et al. |
| 2014/0203606 A1 | 7/2014 | Line et al. |
| 2014/0203610 A1 | 7/2014 | Line et al. |
| 2014/0203617 A1* | 7/2014 | Line .................. B60N 2/4495 297/423.29 |
| 2014/0265506 A1 | 9/2014 | McMillen et al. |
| 2014/0300145 A1 | 10/2014 | Beroth et al. |
| 2014/0300167 A1 | 10/2014 | Datta |
| 2014/0361571 A1 | 12/2014 | Line et al. |
| 2014/0375100 A1 | 12/2014 | Reese |
| 2015/0108816 A1 | 4/2015 | Dry et al. |
| 2015/0157481 A1 | 6/2015 | Whitaker et al. |
| 2015/0157482 A1 | 6/2015 | Batterson et al. |
| 2015/0165935 A1 | 6/2015 | Sachs et al. |
| 2015/0165950 A1* | 6/2015 | Sachs .................. B60N 2/62 297/452.48 |
| 2015/0258914 A1* | 9/2015 | Lee .................. B60N 2/62 297/284.11 |
| 2015/0274050 A1* | 10/2015 | Hosbach .............. B60N 2/62 297/423.26 |
| 2015/0283931 A1* | 10/2015 | Line .................. B60N 2/62 297/423.19 |
| 2015/0283970 A1 | 10/2015 | Line et al. |
| 2015/0375640 A1* | 12/2015 | Yin .................. B60N 2/206 297/157.1 |
| 2016/0080042 A1* | 3/2016 | Thoreux .............. G05B 19/0423 340/1.1 |
| 2016/0090010 A1* | 3/2016 | Line .................. B60N 2/0284 297/284.3 |

FOREIGN PATENT DOCUMENTS

| | | |
|---|---|---|
| DE | 3115269 A1 | 10/1982 |
| DE | 3119867 A1 | 12/1982 |
| DE | 3139945 A1 | 4/1983 |

(56) References Cited

FOREIGN PATENT DOCUMENTS

| | | |
|---|---|---|
| DE | 3519351 A1 | 12/1986 |
| DE | 3735428 A1 | 5/1989 |
| DE | 3841688 A1 | 6/1990 |
| DE | 4403071 A1 | 8/1994 |
| DE | 9415511 U1 | 11/1994 |
| DE | 19857386 A1 | 6/2000 |
| DE | 10106238 A1 | 9/2002 |
| DE | 10201836 A1 | 8/2003 |
| DE | 10331612 A1 | 2/2005 |
| DE | 102004037069 A1 | 4/2005 |
| DE | 102006061226 A1 | 6/2008 |
| DE | 102010024180 A1 | 2/2011 |
| DE | 102010024544 A1 | 12/2011 |
| DE | 102012006074 A1 | 11/2012 |
| DE | 102012011226 A1 | 12/2012 |
| EP | 0174884 B1 | 9/1987 |
| EP | 0386890 A1 | 9/1990 |
| EP | 0518830 A1 | 12/1992 |
| EP | 0627339 A1 | 12/1994 |
| EP | 0670240 A1 | 9/1995 |
| EP | 0754590 A2 | 1/1997 |
| EP | 0594526 B1 | 9/1997 |
| EP | 0921033 A2 | 6/1999 |
| EP | 1077154 A2 | 2/2001 |
| EP | 0926969 B1 | 1/2002 |
| EP | 1266794 A2 | 12/2002 |
| EP | 1325838 A1 | 7/2003 |
| EP | 1462318 A1 | 9/2004 |
| EP | 1123834 B1 | 10/2004 |
| EP | 1002693 B1 | 9/2005 |
| EP | 1050429 B1 | 10/2005 |
| EP | 1084901 B1 | 6/2006 |
| EP | 1674333 A1 | 6/2006 |
| EP | 1674333 B1 | 8/2007 |
| EP | 1839932 A2 | 10/2007 |
| EP | 1950085 A3 | 12/2008 |
| EP | 1329356 B1 | 11/2009 |
| EP | 2289732 A1 | 3/2011 |
| EP | 2423040 A2 | 2/2012 |
| EP | 2534979 A1 | 12/2012 |
| EP | 2565070 A2 | 3/2013 |
| EP | 2574498 A1 | 4/2013 |
| EP | 2743124 A1 | 6/2014 |
| ES | 2107995 T1 | 12/1997 |
| FR | 2562003 A1 | 10/1985 |
| FR | 2875753 A1 | 3/2006 |
| GB | 1260717 A | 1/1972 |
| GB | 2011254 A | 7/1979 |
| GB | 2403139 A | 12/2004 |
| GB | 2430420 B | 3/2009 |
| JP | 61036029 A | 2/1986 |
| JP | 05115331 A | 5/1993 |
| JP | 2008189176 A | 8/2008 |
| JP | 2009096422 A | 5/2009 |
| JP | 201178557 A | 4/2011 |
| JP | 2011098588 A | 5/2011 |
| JP | 2011251573 A | 12/2011 |
| KR | 20050110301 A | 11/2005 |
| KR | 20080066428 A | 7/2008 |
| KR | 20100019390 A | 2/2010 |
| KR | 1020110051692 A | 5/2011 |
| KR | 101180702 B1 | 9/2012 |
| WO | WO9511818 A1 | 5/1995 |
| WO | 9534449 A1 | 12/1995 |
| WO | 9815435 A1 | 4/1998 |
| WO | 9831992 A1 | 7/1998 |
| WO | 9919708 | 4/1999 |
| WO | WO9958022 A1 | 11/1999 |
| WO | 0021797 A1 | 4/2000 |
| WO | 0144026 A1 | 6/2001 |
| WO | WO2006131189 A1 | 12/2006 |
| WO | 2007009893 | 1/2007 |
| WO | WO2007028015 A2 | 3/2007 |
| WO | 2008019981 A1 | 2/2008 |
| WO | WO2008073285 A1 | 6/2008 |
| WO | 2010096307 A1 | 8/2010 |
| WO | WO2011021952 A1 | 2/2011 |
| WO | 2011068684 A1 | 6/2011 |
| WO | WO2012008904 A1 | 1/2012 |
| WO | 2012138699 A1 | 10/2012 |
| WO | 2013040085 A2 | 3/2013 |
| WO | 2013070905 A1 | 5/2013 |
| WO | 2013101644 A1 | 7/2013 |
| WO | 2014047417 A1 | 3/2014 |

OTHER PUBLICATIONS

Richard A Lowry, United States Patent and Trademark Office, Non Final Office Communication re U.S. Appl. No. 13/748,847, Sep. 10, 2014, 14 pages.

David E Allred, United States Patent and Trademark Office, Non Final Office Communication re U.S. Appl. No. 13/748,857, Aug. 25, 2014, 13 pages.

Timothy J Brindley, United States Patent and Trademark Office, Final Office Communication re U.S. Appl. No. 13/749,568, Mar. 26, 2015, 9 pages.

Timothy J Brindley, United States Patent and Trademark Office, Non Final Office Communication re U.S. Appl. No. 13/749,568, Sep. 8, 2014, 9 pages.

Milton Nelson Jr., United States Patent and Trademark Office, Final Office Communication re U.S. Appl. No. 13/749,572, Mar. 3, 2015, 13 pages.

Milton Nelson Jr., United States Patent and Trademark Office, Non Final Office Communication re U.S. Appl. No. 13/749,572, Sep. 30, 2014, 20 pages.

Nicole T Verley, United States Patent and Trademark Office, Non Final Office Communication re U.S. Appl. No. 13/749,589, Oct. 4, 2013, 12 pages.

Timothy J Brindley, United States Patent and Trademark Office, Non Final Office Communication re U.S. Appl. No. 13/749,595, Aug. 28, 2014, 10 pages.

Timothy J Brindley, United States Patent and Trademark Office, Final Office Communication re U.S. Appl. No. 13/749,595, Jan. 12, 2015, 10 pages.

Timothy J Brindley, United States Patent and Trademark Office, Non Final Office Communication re U.S. Appl. No. 13/749,584, Sep. 15, 2014, 9 pages.

Yolanda G Giacoman, United States Patent and Trademark Office, Final Office Communication re U.S. Appl. No. 13/748,862, Dec. 30, 2015, 10 pages.

Yolanda G Giacoman, United States Patent and Trademark Office, Non Final Office Communication re U.S. Appl. No. 13/748,862, Aug. 13, 2015, 9 pages.

Yolanda G Giacoman, United States Patent and Trademark Office, Final Office Communication re U.S. Appl. No. 13/748,862, Mar. 10, 2015, 19 pages.

Yolanda G Giacoman, United States Patent and Trademark Office, Non Final Office Communication re U.S. Appl. No. 13/748,862, Sep. 25, 2014, 16 pages.

Milton Nelson Jr., United States Patent and Trademark Office, Non Final Office Communication re U.S. Appl. No. 13/749,602, Sep. 19, 2014, 9 pages.

Melissa Ann Black, United States Patent and Trademark Office, Non Final Office Communication re U.S. Appl. No. 13/914,666, Mar. 13, 2015, 6 pages.

Philip F Gabler, United States Patent and Trademark Office, Non Final Office Communication re U.S. Appl. No. 14/025,483, Dec. 17, 2014, 8 pages.

Philip F Gabler, United States Patent and Trademark Office, Final Office Communication re U.S. Appl. No. 14/025,483, Apr. 23, 2015, 10 pages.

Philip F Gabler, United States Patent and Trademark Office, Non Final Office Communication re U.S. Appl. No. 14/025,483, Aug. 18, 2015, 14 pages.

Philip F Gabler, United States Patent and Trademark Office, Final Office Communication re U.S. Appl. No. 14/025,483, Dec. 18, 2015, 14 pages.

(56) References Cited

OTHER PUBLICATIONS

Peter R Brown, United States Patent and Trademark Office, Final Office Communication re U.S. Appl. No. 14/104,780, Dec. 1, 2015, 5 pages.
Peter R Brown, United States Patent and Trademark Office, Non Final Office Communication re U.S. Appl. No. 14/104,780, Jun. 29, 2015, 9 pages.
Nicole T Verley, United States Patent and Trademark Office, Advisory Action for U.S. Appl. No. 14/056,005, Sep. 30, 2015, 3 pages.
Nicole T Verley, United States Patent and Trademark Office, Final Office Communication re U.S. Appl. No. 14/056,005, Jun. 10, 2015, 8 pages.
Nicole T Verley, United States Patent and Trademark Office, Non Final Office Communication re U.S. Appl. No. 14/056,005, Mar. 2, 2015, 8 pages.
Peter R Brown, United States Patent and Trademark Office, Non Final Office Communication re U.S. Appl. No. 14/056,000, Mar. 4, 2015, 7 pages.
Peter R Brown, United States Patent and Trademark Office, Non Final Office Communication re U.S. Appl. No. 14/056,000, Oct. 1, 2014, 8 pages.
Philip F Gabler, United States Patent and Trademark Office, Final Office Communication re U.S. Appl. No. 14/076,893, Sep. 29, 2015, 13 pages.
Philip F Gabler, United States Patent and Trademark Office, Non Final Office Communication re U.S. Appl. No. 14/076,893, Apr. 21, 2015, 12 pages.
David E Allred, United States Patent and Trademark Office, Non Final Office Communication re U.S. Appl. No. 14/063,647, Aug. 18, 2015, 19 pages.
Matthew W Ing, United States Patent and Trademark Office, Non Final Office Communication re U.S. Appl. No. 14/609,092, Oct. 19, 2015, 11 pages.
Alexander Scott Harrison, United States Patent and Trademark Office, Final Office Communication re U.S. Appl. No. 14/243,027, Jan. 20, 2016, 17 pages.
Alexander Scott Harrison, United States Patent and Trademark Office, Non Final Office Communication re U.S. Appl. No. 14/243,027, Aug. 13, 2015, 15 pages.
Ryan D Kwiecinski, United States Patent and Trademark Office, Non Final Office Communication re U.S. Appl. No. 14/230,961, Dec. 24, 2015, 12 pages.
Philip F Gabler, United States Patent and Trademark Office, Final Office Communication re U.S. Appl. No. 14/257,655, Dec. 18, 2015, 10 pages.
Philip F Gabler, United States Patent and Trademark Office, Non Final Office Communication re U.S. Appl. No. 14/257,655, Aug. 20, 2015, 10 pages.
Syed A Islam, United States Patent and Trademark Office, Final Office Communication re U.S. Appl. No. 14/275,368, Nov. 13, 2015, 13 pages.
Syed A Islam, United States Patent and Trademark Office, Non Final Office Communication re U.S. Appl. No. 14/275,368, May 6, 2015, 10 pages.
Laurie K Cranmer, United States Patent and Trademark Office, Non Final Office Communication re U.S. Appl. No. 14/505,675, Aug. 31, 2015, 7 pages.
Rodney Barnett White, United States Patent and Trademark Office, Non Final Office Communication re U.S. Appl. No. 14/600,166, Nov. 2, 2015, 7 pages.
Rodney Barnett White, United States Patent and Trademark Office, Final Office Communication re U.S. Appl. No. 14/534,296, Dec. 11, 2105, 14 pages.
Rodney Barnett White, United States Patent and Trademark Office, Non Final Office Communication re U.S. Appl. No. 14/534,296, Aug. 26, 2015, 13 pages.
Sanjeev Malhotra, United States Patent and Trademark Office, Non Final Office Communication re U.S. Appl. No. 14/534,285, Sep. 23, 2015, 14 pages.

Vicole T Verley, United States Patent and Trademark Office, Non Final Office Communication re U.S. Appl. No. 14/635,025, Dec. 4, 2015, 8 pages.
M. Grujicic et al., "Seat-cushion and soft-tissue material modeling and a finite element investigation of the seating comfort for passenger-vehicle occupants," Materials and Design 30 (2009) 4273-4285.
"Thigh Support for Tall Drivers," http://cars.about.com/od/infiniti/ig/2009-Infiniti-G37-Coupe-pics/2008-G37-cpe-thigh-support.htm (1 page) [Accessed from the Internet Apr. 10, 2013].
Mladenov, "Opel Insignia Receives Seal of Approval for Ergonomic Seats," Published Aug. 27, 2008, http://www.automobilesreview.com/auto-news/opel-insignia-receives-seal-of-approval-for-ergonomic-seats/4169/ (2 pages).
Brose India Automotive Systems, "Adaptive Sensor Controlled Headrest," http://www.indiamart.com/proseindiaautomotivesystems/products.html, Oct. 9, 2012 (12 pages).
eCOUSTICS.com, "Cineak Motorized Articulating Headrest Preview," http://www.ecoustics.com/ah/reviews/furniture/accessories/cineak-motorized-headrest, Oct. 9, 2012 (3 pages).
"Performance' Car Seat Eliminates Steel," Published in Plastics News—Indian Edition Plastics & Polymer News, (http://www.plasticsinfomart.com/performance-car-seat-eliminates-steel/), Jan. 2012, 3 pages.
"Frankfurt 2009 Trend—Light and Layered." by Hannah Macmurray, Published in GreenCarDesign, (http://www.greencardesign.com/site/trends/00138-frankfurt-2009-trend-light-and-layered), Sep. 2009, 9 pages.
"Imola Pro-fit", Cobra, (http://cobra.subesports.com/products/cat/seats/brand/Cobra/prodID/656), Date unknown, 2 pages.
Freedman Seating Company, "GO SEAT," http://www.freedmanseating.com/images/uploads/files/GOSeat_Brochure_10-19.pdf, (date unknown), 2 pgs.
Metro Magazine, "Vehicle Seating Manufacturers Offer Flexible Dseign Options, Enhanced Construction," http://www.metro-magazine.com/article/prinl/2012/01/vehicle-seating-manufacturers-offer-flexible-design-options-enahnced-construction.aspx, Jan. 2012, 3 pgs.
"Seat Comfort Systems", Installation Manual, KIT P/N: SCSOOOOOC3, http://www.techwebasto.com/accessories_mainiseat_accessories/g_scs_vent_install.pdf, (date unknown), 7 pgs.
Car Reviews, "Audi A4 Saloon RS4", http://www.theaa.com/allaboutcars/cartestreports/2006037.html, Apr. 2006, 5 pgs.
Recaro Gmbh & Co. KG, "Seat Range", ID No. 7218054, Mar. 2010, 21 pgs.
Kelley Blue Book, "2011 Mercedes-Benz CL-Class", http://www.kbb.com/mercedes-benz/cl-class/2011- rnercedes-benz-cl-class/, Feb. 28, 2013, 5 pgs.
Lexus, "The all-new LEXUS 2013", lexus.com P2-332, Feb. 2012, 13 pgs.
Mercedes-Benz, "Interior comfort—spoilt for choice", http://www.zungfu.com/pc_E_saloon.comfort.1.shtml, Feb. 28, 2013, 3 pgs.
Rostra Precision Controls Inc., "Universal Lumbar Installation Instructions", http://www.rostra.com/manuals/form3132F.pdf, Nov. 2, 2007, 8 pgs.
"Seats", http://www.bavarianmw.com/guide-4400.html, www.bmwmanuals.org, 2012, 5 pgs.
Mercedes-Benz, "Seat belts and airbags", http://www.mbusa.com/vcm/MB/DigitalAssets/pdfmb/serviceandparts/seatbelts_airbags_pdf, Oct. 27, 2005, 11 pgs.
SAE International, "Capacitive Sensors Increase Safety, Comfort", http://sae.org/automag/technewsletter/071106Electronics/04.htm, Jun. 13, 2013, 3 pages.
General Motors LLC, "2013 Chevrolet Spark Owner Manual," copyright 2012, 356 pages.

\* cited by examiner

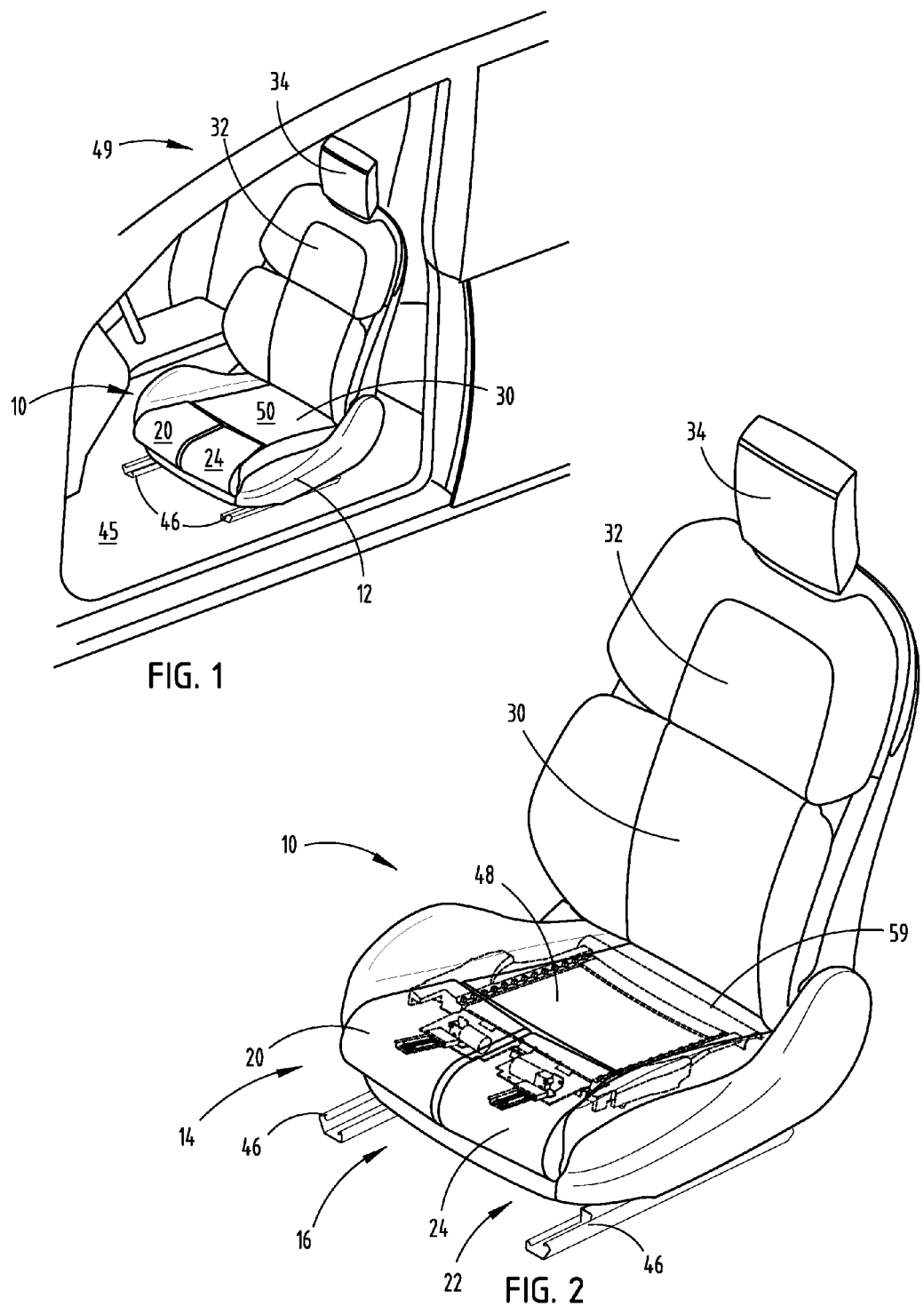

US 9,649,962 B2

INDEPENDENT CUSHION EXTENSION AND THIGH SUPPORT

CROSS-REFERENCE TO RELATED APPLICATION

The present application is a continuation of U.S. patent application Ser. No. 13/748,862, filed Jan. 24, 2013, now U.S. Pat. No. 9,399,418, entitled "INDEPENDENT CUSHION EXTENSION AND THIGH SUPPORT," the entire disclosure of which is hereby incorporated herein by reference.

FIELD OF THE INVENTION

The present invention generally relates to a vehicle seating assembly, and more particularly to a vehicle seating assembly that includes an independent cushion extension and thigh support.

BACKGROUND OF THE INVENTION

Modern vehicle seats are becoming more and more comfortable as a further understanding of human ergonomics, posture, and comfortability is studied. Vehicle seating assemblies that include comfort components in the vehicle seat back and the vehicle seat can provide the driver and passengers with improved comfort and increased endurance for extensive vehicle rides. Additionally, various sizes and shapes of drivers and passengers can prove challenging when providing vehicle seating assemblies. Accordingly, vehicle seating assemblies that include components to accommodate the different sizes and shapes of drivers and passengers, as well as the desired posture and sitting positions of those drivers and passengers, has become increasingly important.

SUMMARY OF THE INVENTION

According to one aspect of the present invention, a vehicle seating assembly includes a seat frame. A first leg support is pivotally coupled with a forward portion of the seat frame. The first leg support is operable between raised and lowered positions. A first extendable member is disposed on a top portion of the first leg support and is operable between extended and retracted positions. A second leg support is adjacent to and independent of the first leg support and is pivotally coupled with the forward portion of the seat frame. The second leg support is operable between raised and lowered positions. A second extendable member is disposed on a top portion of the second leg support and is operable between extended and retracted positions.

According to another aspect of the present invention, a vehicle seating assembly includes a seat frame. A first leg support is pivotally coupled with a forward portion of the seat frame. The first leg support includes a first extendable member disposed on a top portion thereof. A second leg support is independent of the first leg support and is pivotally coupled with the forward portion of the seat frame. The second leg support includes a second extendable member disposed on a top portion thereof.

According to yet another aspect of the present invention, a vehicle seating assembly includes a seat frame supporting a pivot rod and first and second distinct leg supports. Each of the first and second distinct leg supports includes a body portion and a flange that extends over the pivot rod. The flange is spring-biased and operably coupled to a motor that pivots the first and second distinct leg supports between raised and lowered positions. Each of the first and second distinct leg supports includes an extendable member slidably coupled therewith.

These and other aspects, objects, and features of the present invention will be understood and appreciated by those skilled in the art upon studying the following specification, claims, and appended drawings.

BRIEF DESCRIPTION OF THE DRAWINGS

In the drawings:

FIG. 1 is a top perspective view of one embodiment of a vehicle seating assembly of the present invention disposed in a vehicle;

FIG. 2 is a top perspective view of the vehicle seating assembly of FIG. 1;

DETAILED DESCRIPTION OF THE EMBODIMENTS

Figure 3:
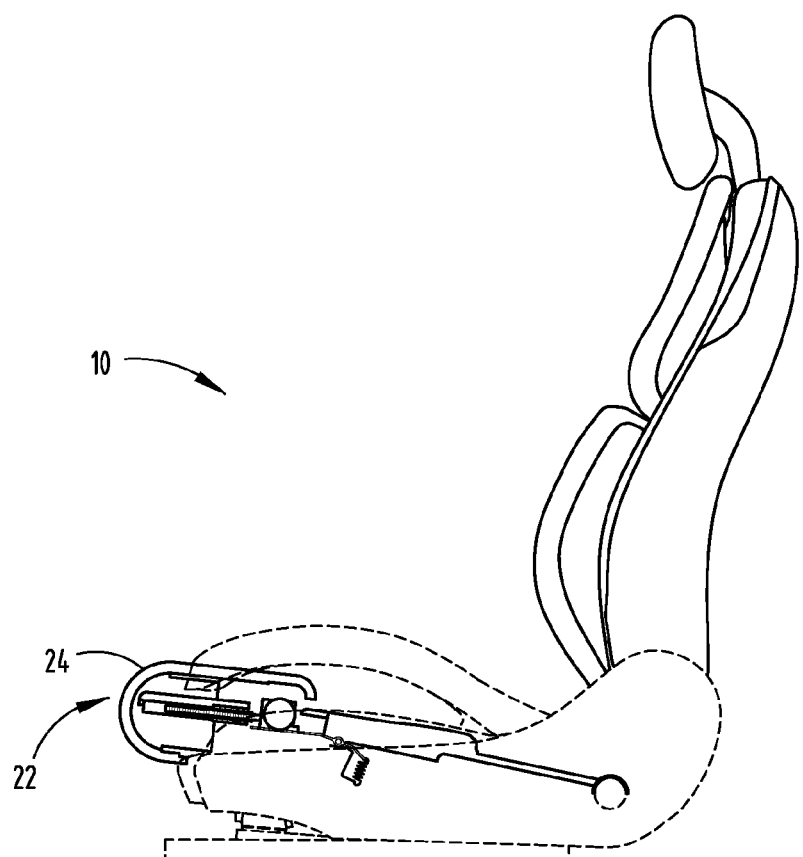
FIG. 3 is a side elevational view of a vehicle seating assembly of the present invention.

For purposes of description herein, the terms "upper," "lower," "right," "left," "rear," "front," "vertical," "horizontal," and derivatives thereof shall relate to the invention as oriented in FIG. 1. However, it is to be understood that the invention may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

Referring to FIGS. 1 and 2, reference numeral 10 generally designates a vehicle seating assembly having a seat frame 12. A first leg support 14 is pivotally coupled with a forward portion 16 of the seat frame 12. The first leg support 14 is operable between raised and lowered positions. A first extendable member 20 is disposed on the first leg support 14 and is operable between extended and retracted positions. A second leg support 22 is adjacent to and independent of the first leg support 14 and is pivotally coupled with the forward portion 16 of the seat frame 12. The second leg support 22 is operable between raised and lowered positions. A second extendable member 24 is disposed on the second leg support 22 and is operable between extended and retracted positions.

Referring again to FIGS. 1 and 2, the vehicle seating assembly 10 generally includes a seat 30 and a seat back 32 that supports a headrest 34 thereon. The seat back 32 is pivotally coupled with the seat 30, such that the seat back 32 can be moved between upright and inclined positions. The headrest 34 is operably coupled with the seat back 32 and also positioned in a variety of positions relative to the seat back 32 to support the head and neck of a driver or a passenger. The seat frame 12 includes first and second side members 40, 42 (FIG. 4) supported on legs 44 (FIG. 5). Laterally extending frame members 43 (FIG. 5) extend between the first and second side members 40, 42. The legs 44 are operably coupled with slide assemblies 46 that are secured to a floor 45 of a vehicle 49.

Figure 4:
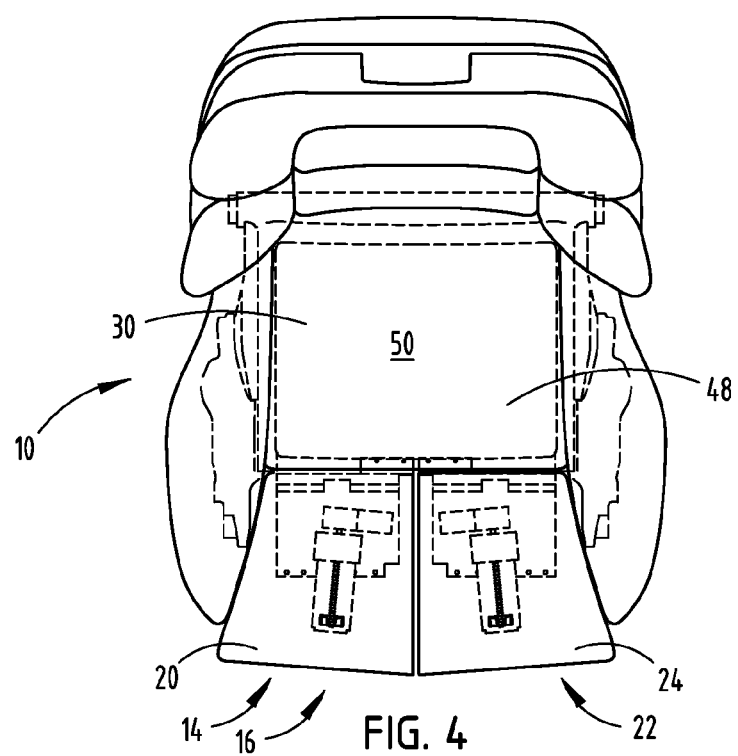
FIG. 4 is a top plan view of the vehicle seating assembly of FIG. 3.
Figure 5:
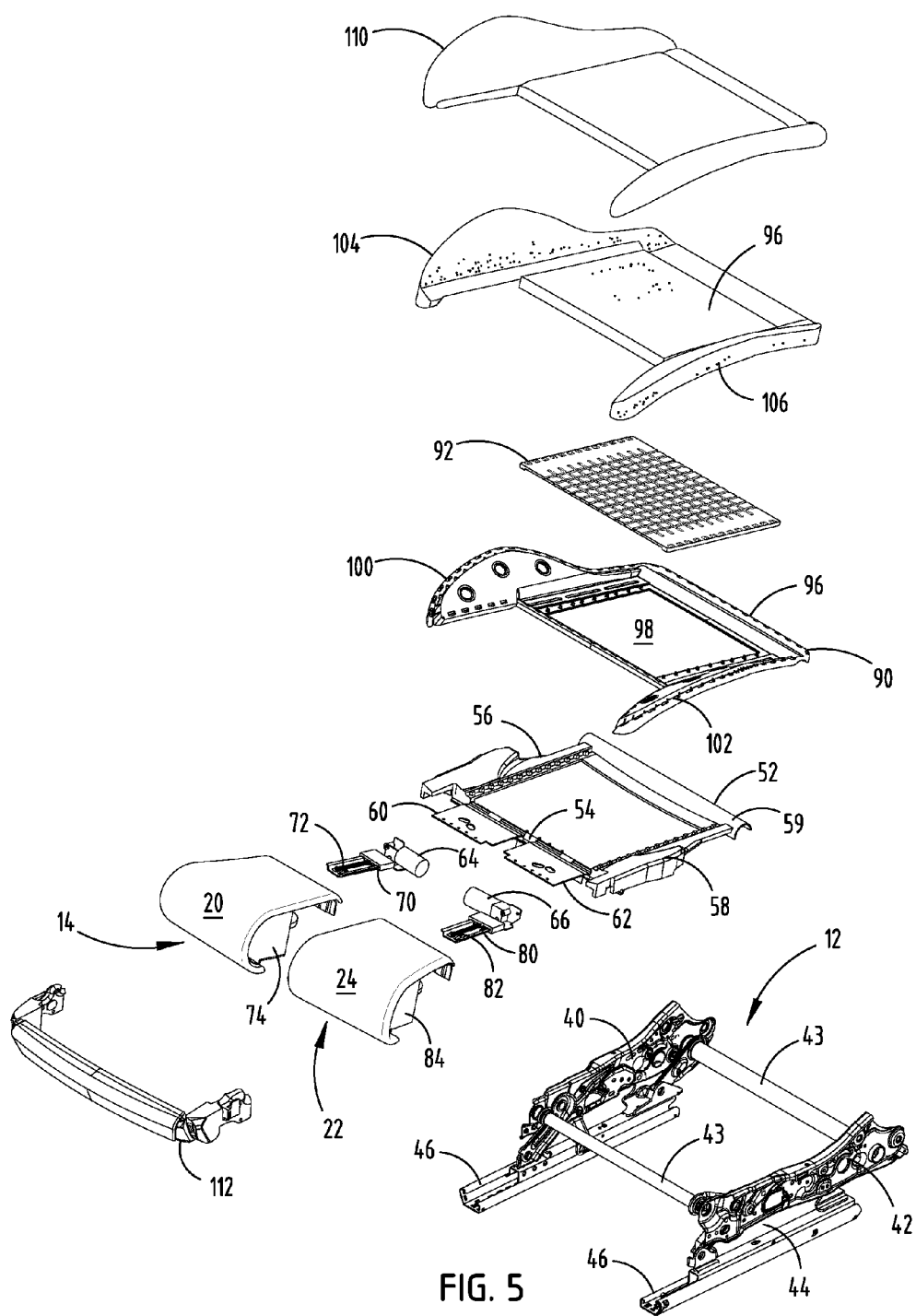
FIG. 5 is a top perspective exploded view of the seat of the vehicle seating assembly of FIG. 3.

Referring now to FIGS. 3 and 4, the vehicle seating assembly 10 is generally configured to apply selective support to the underside of the legs of the driver or passenger. Specifically, as shown in FIG. 3, each leg of the driver or passenger can be independently supported by an independent leg support. The first and second leg supports 14, 22 are moveable between raised and lowered positions, as well as between extended and retracted positions to modify an effective seating area 48 of the seat 30 and accommodate the size, shape, posture, and sitting positions of the driver or passenger.

Referring now to FIG. 5, the vehicle seating assembly 10 includes a seat base 50 that is supported over the seat frame 12. An interface member 52 is positioned between the seat frame 12 and the seat base 50. The seat base 50 is disposed behind the first and second leg supports 14, 22, and in front of the seat back 32. The interface member 52 includes a pivot rod 54 that extends between first and second sides 56, 58 of the interface member 52. Additionally, a rear portion of the interface member 52 includes a frame engagement component 59 that secures the interface member 52 to the seat frame 12. The pivot rod 54 also includes first and second support bases 60, 62 that support the first and second leg supports 14, 22, respectively. The first and second support bases 60, 62 are operably coupled with first and second motors 64, 66. The first motor 64 is operably coupled with a slide 70 and a drive shaft 72. The drive shaft 72 is capable of laterally translating a support body 74 between extended and retracted positions. The first support base 60 is configured to rotate the first leg support 14 about the pivot rod 54 between the raised and lowered positions, as discussed in further detail herein. Similarly, the second motor 66 is operably coupled with a slide 80 and a drive shaft 82. The drive shaft 82 is capable of laterally translating a support body 84 of the second leg support 22 between extended and retracted positions. The second support base 62 is configured to rotate the second leg support 22 between the raised and lowered positions.

Referring again to FIG. 5, the interface member 52 includes a suspension frame 90 disposed thereon. The suspension frame 90 is configured to provide sufficient support to a suspension member 92 and a seat cushion 94. Accordingly, the suspension frame 90 includes a shape that largely complements the shape of the seat cushion 94. Specifically, the suspension frame 90 includes a body 96 defining an aperture 98 configured to receive the suspension member 92, which supports the seat cushion 94. At the same time, first and second wings 100, 102 extend from the body 96 and are configured to support first and second side cushions 104, 106 of the seat cushion 94. The seat cushion 94 is supported above the suspension frame 90 and is protected by a coverstock 110. It is anticipated that the coverstock 110 could be any of a variety of materials, including traditional fabrics, as well as leathers, vinyls, etc. A lateral seat brace 112 is positioned below the first and second leg supports 14, 22 and is coupled to the seat frame 12. The lateral seat brace 112 assists in guiding the first and second leg supports 14, 22 between the various positions, and at the same time, provides additional rigidity to the seat frame 12 of the vehicle seating assembly 10. The lateral seat brace 112 also includes a shroud that protects a forward portion of the vehicle seating assembly 10 and is aesthetically pleasing to view.

Figure 6:
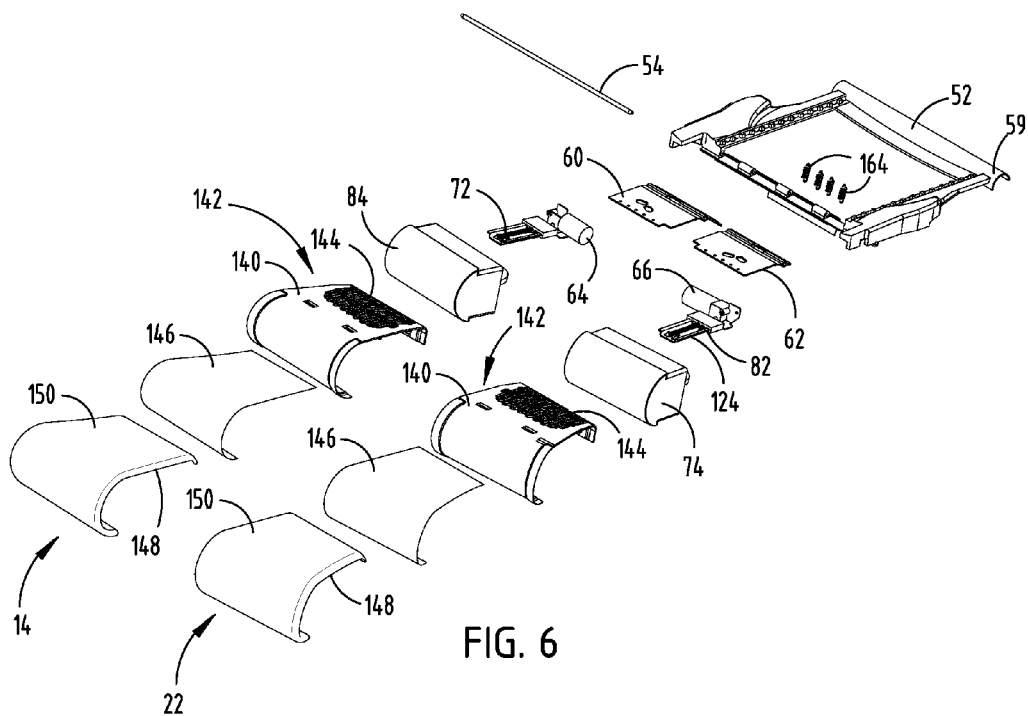
FIG. 6 is a top perspective exploded view of a portion of the seat of the vehicle seating assembly of FIG. 3.
Figure 7:
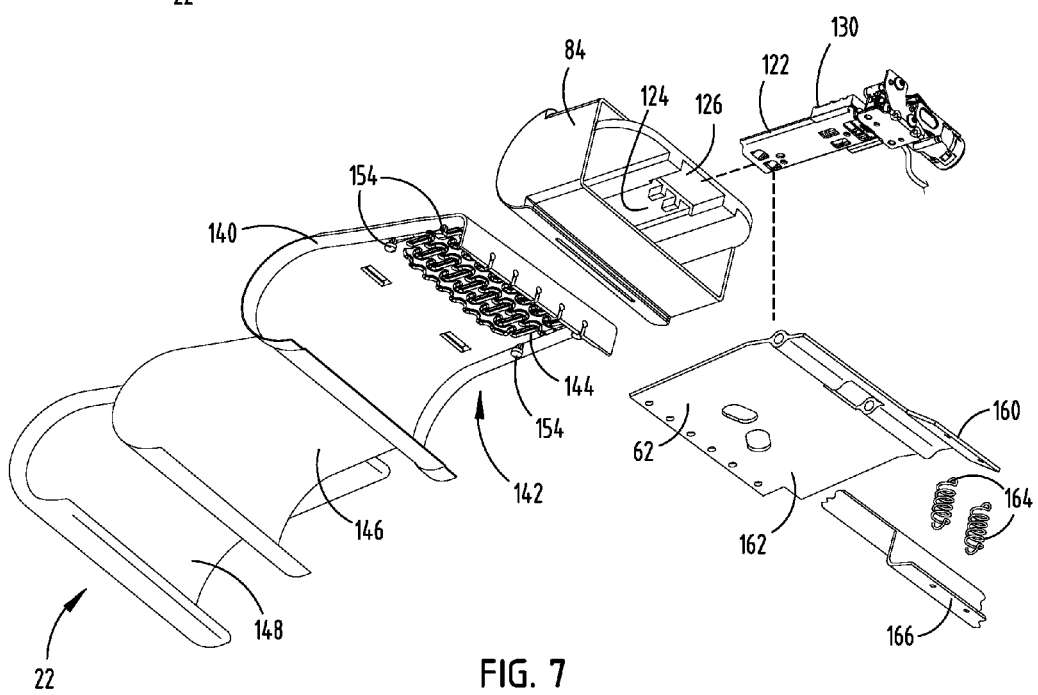
FIG. 7 is a bottom perspective exploded view of a portion of the seat of the vehicle seating assembly of FIG. 3.
Figure 9:
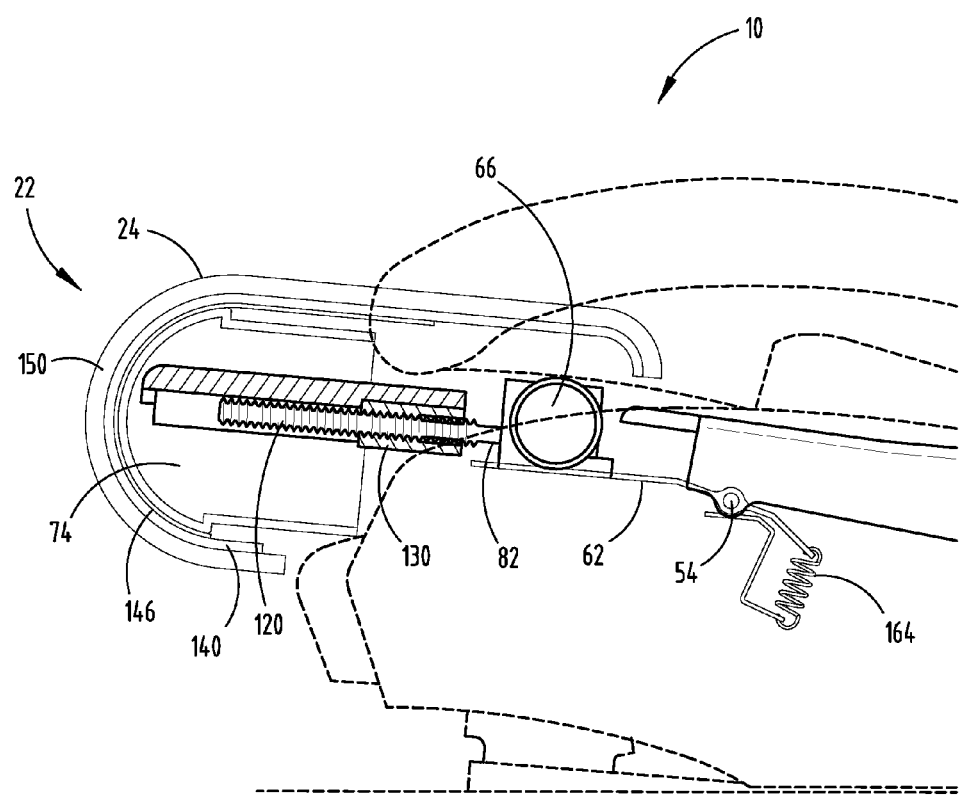
FIG. 9 is a partial side cross-sectional elevational view taken at line IX-IX illustrating the leg supports of FIG. 8 in a retracted position.

Referring now to FIGS. 6 and 7, the first and second leg supports 14, 22 will be discussed in further detail. The first and second leg supports 14, 22 are configured to engage the interface member 52 of the vehicle seating assembly 10. Specifically, the first and second support bases 60, 62 are pivotally coupled with the pivot rod 54 that is rotatably or fixedly coupled with the interface member 52 of the vehicle seating assembly 10. The first and second support bases 60, 62 are operable between the raised and lowered positions about the pivot rod 54. The first and second motors 64, 66 of the first and second leg supports 14, 22, respectively, are positioned on the first and second support bases 60, 62. The first and second motors 64, 66 are operably coupled with the drive shafts 72, 82, respectively. Each drive shaft 72, 82 includes a screw gear 120 (FIG. 9) disposed thereon. The screw gear 120 allows for linear translation of the first and second leg supports 14, 22 between the extended and retracted positions, as discussed below.

Referring again to FIGS. 6 and 7, each of the first and second leg supports 14, 22 includes a slide assembly 122. The support bodies 74, 84 are configured to engage the slide assembly 122. The support bodies 74, 84 of the first and second leg supports 14, 22 include a receiving slot 124 configured to receive a portion of the slide assembly 122. Each receiving slot 124 includes an enlarged recess 126 that is configured to receive a slide block 130 on the slide assembly 122. The slide block 130 is linearly translatable via the screw gear 120 between fore and aft positions. The slide block 130 is configured to engage the enlarged recess 126, thereby coupling the support body 74 or 84 with the slide assembly 122. As described in further detail below, when the slide block 130 is in the aft position, the relevant leg support 14 or 22 is in the retracted position. Similarly, when the slide block 130 is in the fore position, the relevant leg support 14 or 22 is in the extended position.

Referring again to FIGS. 6 and 7, each support body 74, 84 is generally configured to be coupled with a flex member 140 disposed thereon. The flex member 140 includes an open matrix 142 of flex apertures 144 that provide additional comfort and flexibility for the driver or passenger. At the same time, the flex apertures 144 provide some breathability in the first and second leg supports 14, 22 of the vehicle seating assembly 10. The flex member 140 is positioned on top of the support body 74 or 84 and is covered by a protective wrap 146. The protective wrap 146 is covered by a leg support coverstock 148 and a cushion layer 150. The leg support coverstock 148 and the cushion layer 150 protect the wrap 146 and the flex member 140. As shown in FIG. 7, each support body 74, 84 includes a number of engagement pins 154 that secure the flex member 140 to the support bodies 74, 84. Each of the first and second support bases 60, 62 of the first and second leg supports 14, 22, respectively, includes a rearwardly extending flange 160 that extends on an opposite side from a body 162 of the first and second support bases 60, 62. The rearwardly extending flange 160 is coupled with tension springs 164 that are coupled to a mounting bracket 166. The tension springs 164 bias the relevant support base 60 or 62 to the raised position. It is generally contemplated that the support body 74 of the first leg support 14 and the support body 84 of the second leg support 22 may be moveable to the raised position and the lowered position via an actuation assembly operably coupled with a motor. Alternatively, adjustment of the first and second leg supports 14, 22 may be made manually via a gear system, as understood by one having ordinary skill in the art.

Figure 8:
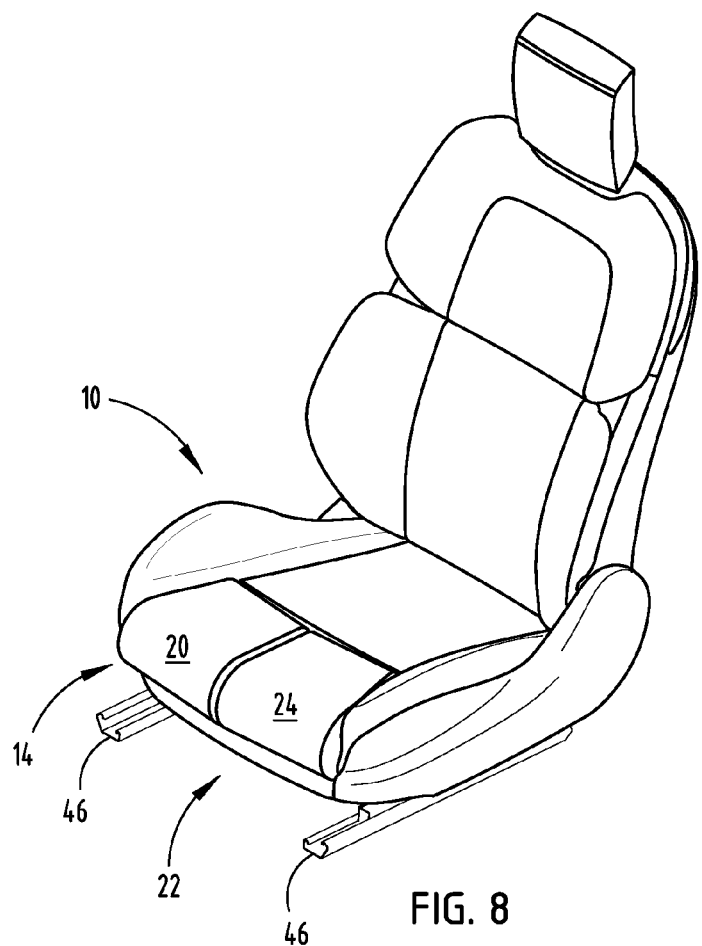
FIG. 8 is a top perspective view of the vehicle seating assembly of FIG. 3 with first and second leg supports in the retracted and lowered positions.
Figure 8A:
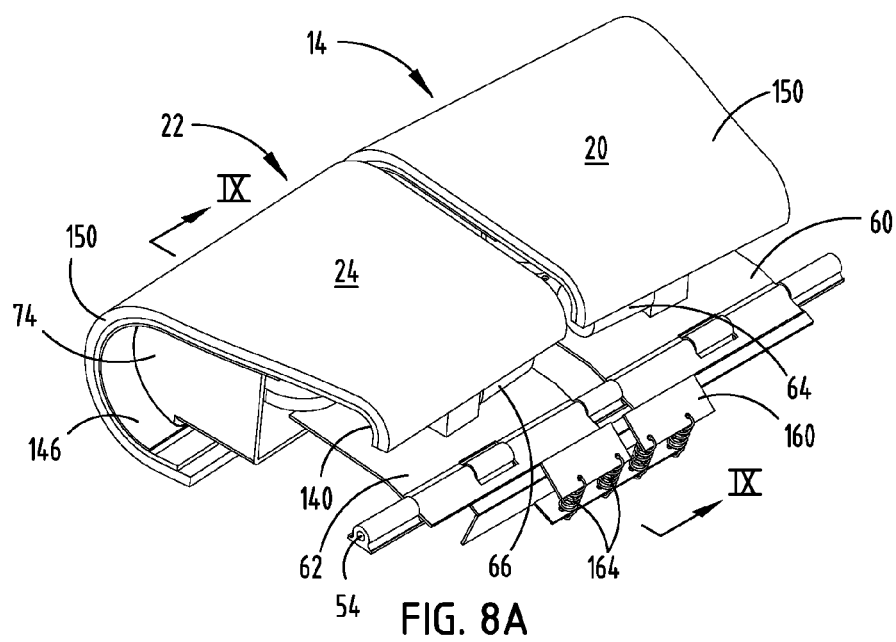
FIG. 8A is a top perspective view of the leg supports of FIG. 8.

Referring now to FIGS. 8 and 8A, the vehicle seating assembly 10 is illustrated with the first and second leg supports 14, 22 moved to an initial position. In the initial position, the first and second leg supports 14, 22 are in the retracted position and also in the lowered position. In this initial position, the seating area 48 of the seat 30 has not been enlarged. Accordingly, the seating area 48 is generally configured to support a driver or passenger that is smaller in stature. In the event the driver or passenger has a larger stature and wishes to change the effective seating area 48 of the vehicle seating assembly 10, then the first and second leg supports 14, 22 can be raised independently and also extended independently.

Figure 10:
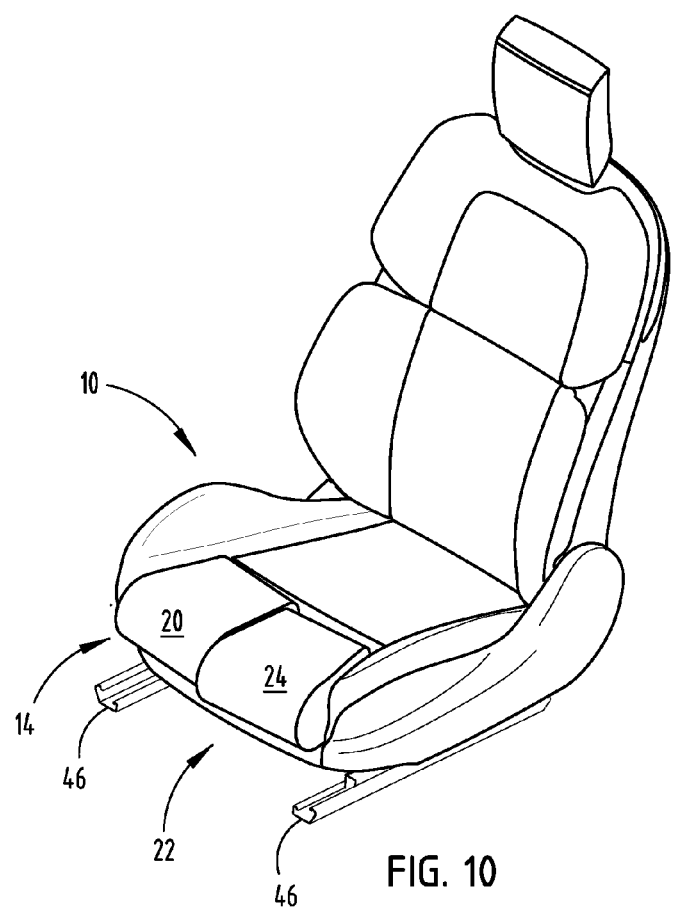
FIG. 10 is a top perspective view of the vehicle seating assembly of the present invention with one of the leg supports in a lowered position.
Figure 10A:
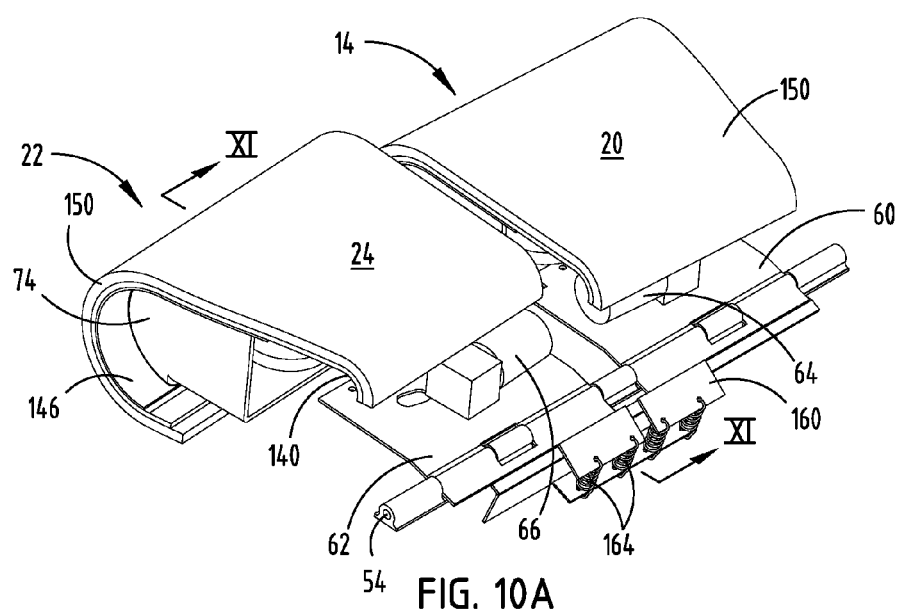
FIG. 10A is a top perspective view of the leg supports of FIG. 10 with one of the leg supports in a lowered position.

Referring now to FIGS. 10 and 10A, in the illustrated embodiment, the second leg support 22 has been translated to the extended position. To move the second leg support 22 to the extended position, the driver or passenger would simply engage a toggle switch on the seat 30 that is operably coupled to the second motor 66. The second motor 66 then activates, which turns the drive shaft 82 that is coupled with the screw gear 120. As the screw gear 120 rotates, the support body 84 of the second leg support 22 is pushed outwardly away from the seat base 50. At the same time, the first leg support 14 maintains position and does not move. In the event the driver or passenger also wanted the first leg support 14 to be moved to the extended position, the driver or passenger could engage in the same behavior to actuate the first motor 64, which would then force the support body 74 of the first leg support 14 outward in a similar fashion to that described above with reference to the second leg support 22.

Figure 11:
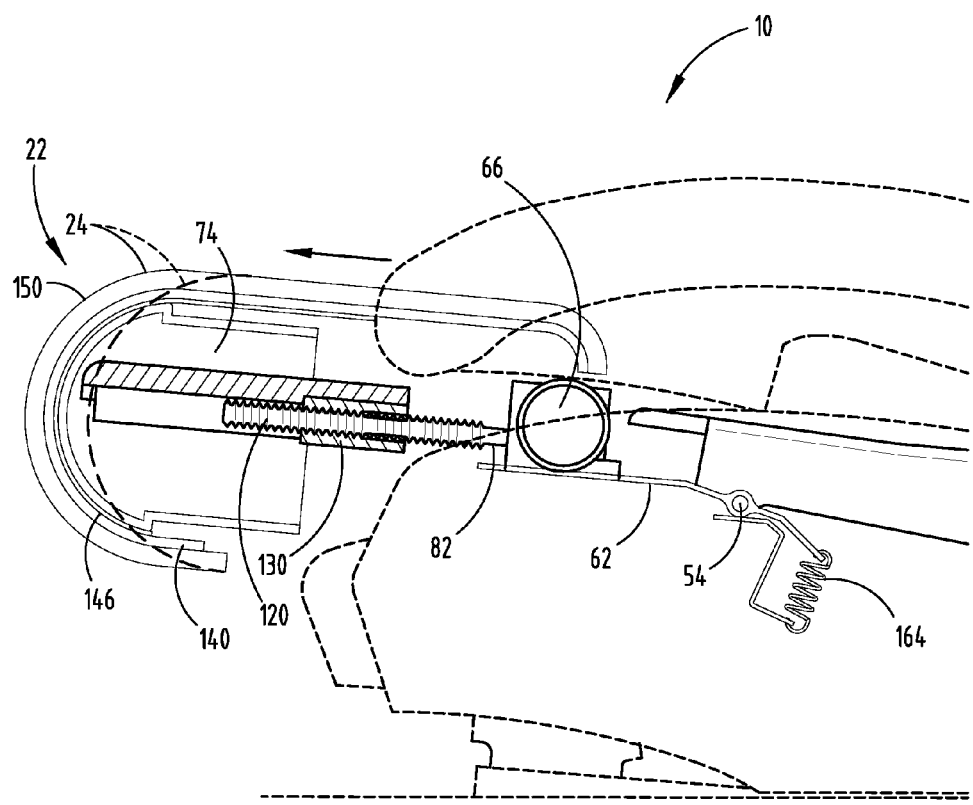
FIG. 11 is a partial side elevational cross-sectional view taken at line XI-XI of FIG. 10A illustrating one of the leg supports in an extended position.

As shown in FIG. 11, as the screw gear 120 rotates, the slide block 130 begins to move relative to the screw gear 120. Specifically, when the second motor 66 operates in a first direction, the screw gear 120 rotates such that threads of the screw gear 120 push internal threads of the slide block 130, which translates the slide block 130 and the second leg support 22 away from the seat base 50 (corresponding to the extended position of the second leg support 22). When the second motor 66 operates in a second direction, the screw gear 120 turns in a second direction opposite the first direction, such that the slide block 130 is drawn toward the seat base 50 (corresponding with the retracted position of the second leg support 22).

Figure 12:
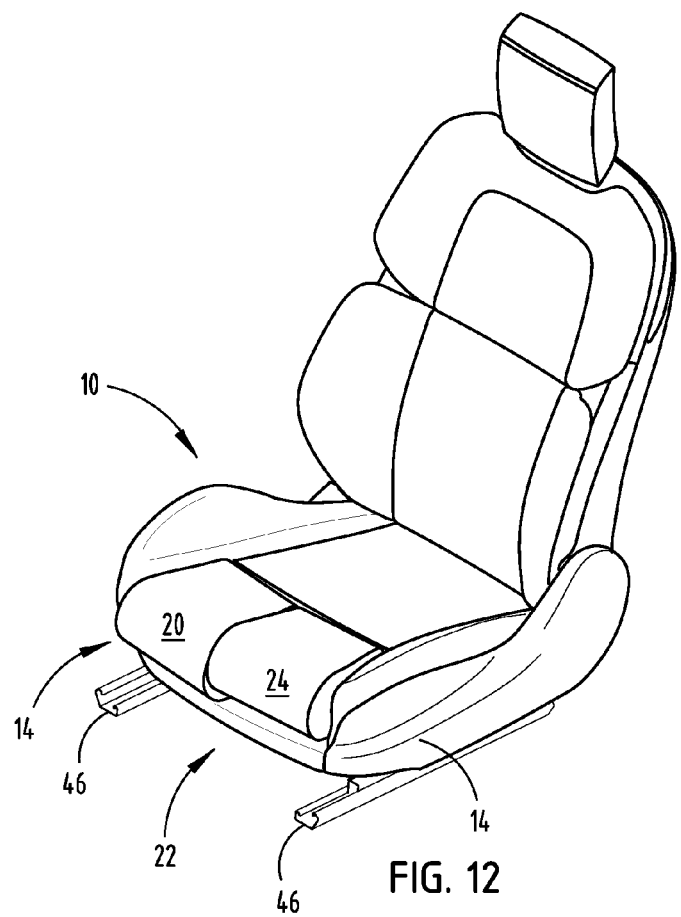
FIG. 12 is a top perspective view of one embodiment of the vehicle seating assembly of the present invention with one of the leg supports in a raised position.
Figure 12A:
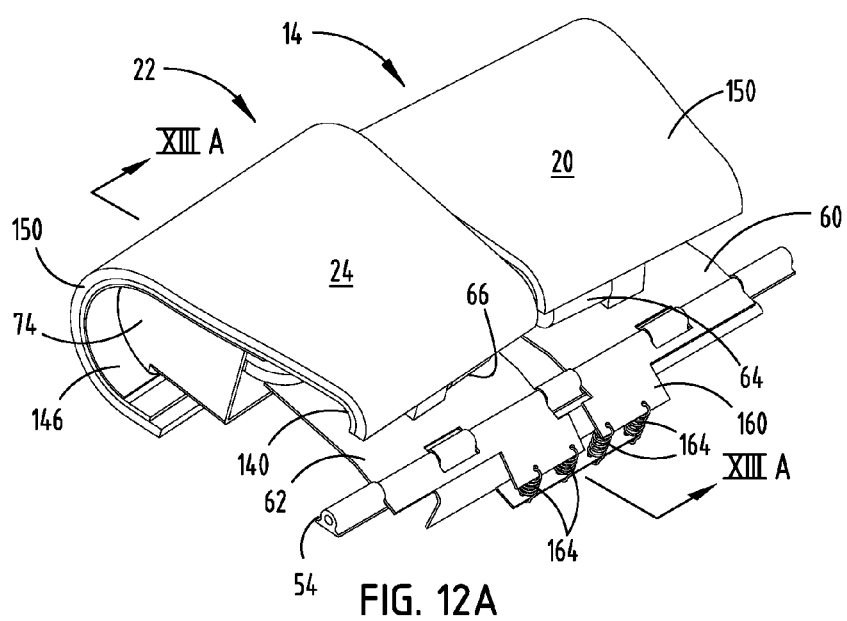
FIG. 12A is a top perspective view of the leg supports of FIG. 12 with one of the leg supports in the raised position.

Referring now to FIGS. 12 and 12A, the vehicle seating assembly 10 is illustrated with the second leg support 22 in a raised position. In the raised position, the second leg support 22 is better situated to hold or support the underside of a leg of the driver or passenger when the leg is not extended. The second leg support 22 is moved to the raised position under the force of the tension springs 164 alone, or under the force of the tension springs 164 and a motor operably coupled to the second support base 62 that urges the second leg support 22 to the raised position. The first leg support 14 operates in much the same way. Notably, the first and second leg supports 14, 22 may be at the lowered position, the raised position, or any position therebetween simultaneously. However, the first and second leg supports 14, 22 may also be placed at different positions. For example, the first leg support 14 may be at the lowered position, while the second leg support 22 may be at the raised position. Moreover, at the same time, regardless of the raised or lowered positions of the first and second leg supports 14, 22, the first and second leg supports 14, 22 may also be at the extended or retracted positions. Again, the first and second leg supports 14, 22 may be placed at the retracted position or the extended position simultaneously. Alternatively, the first and second leg supports 14, 22 may be positioned differently. For example, the first leg support 14 may be at the lowered position and the retracted position, while the second leg support 22 may be at the extended position and the raised position.

Figure 13A:
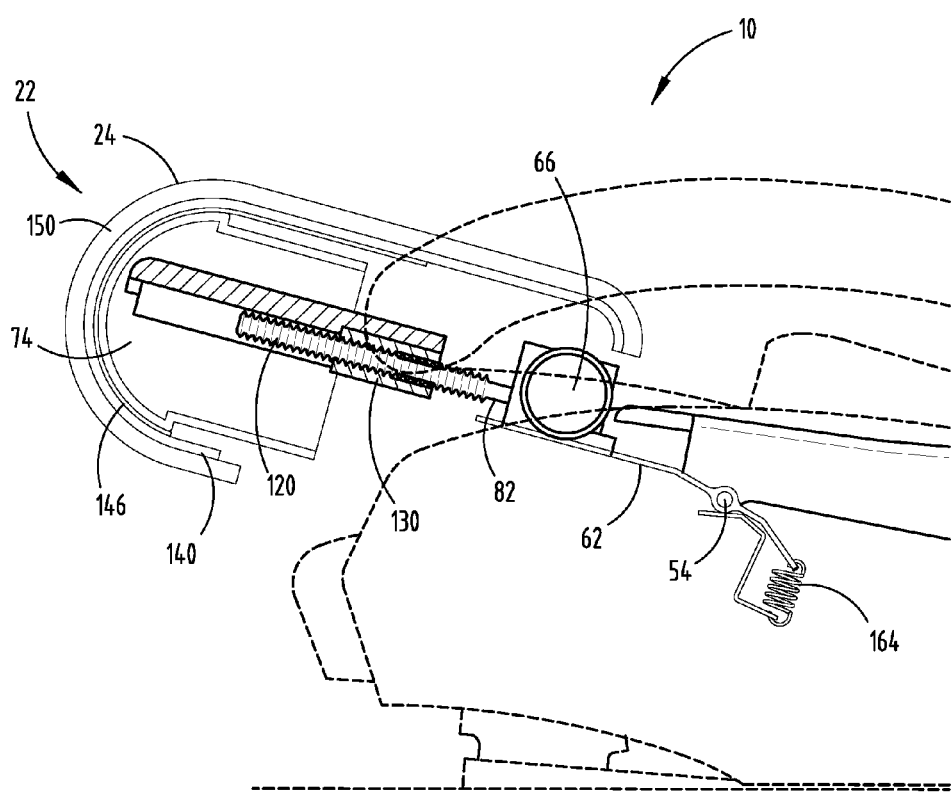
FIG. 13A is a partial side elevational cross-sectional view taken at XIIIA-XIIIA of the leg support of FIG. 12A in the raised position.
Figure 13B:
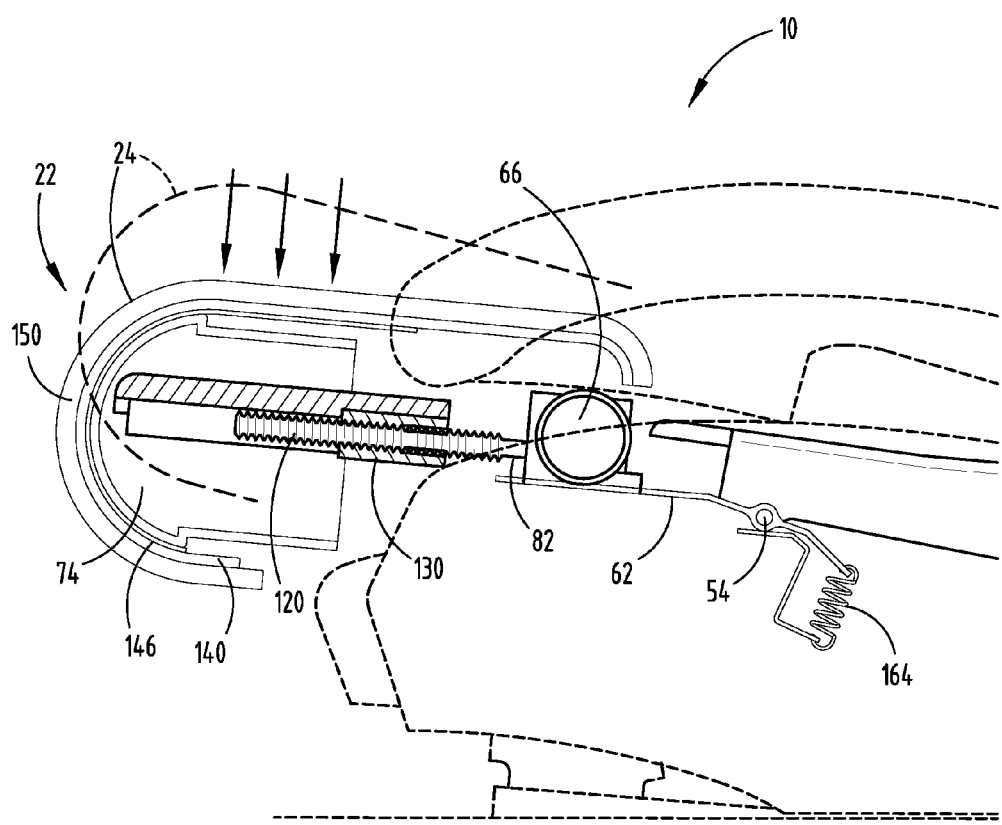
FIG. 13B is a partial side elevational cross-sectional view of the leg support of FIG. 13A after movement from the raised position to the lowered position.
Figure 13C:
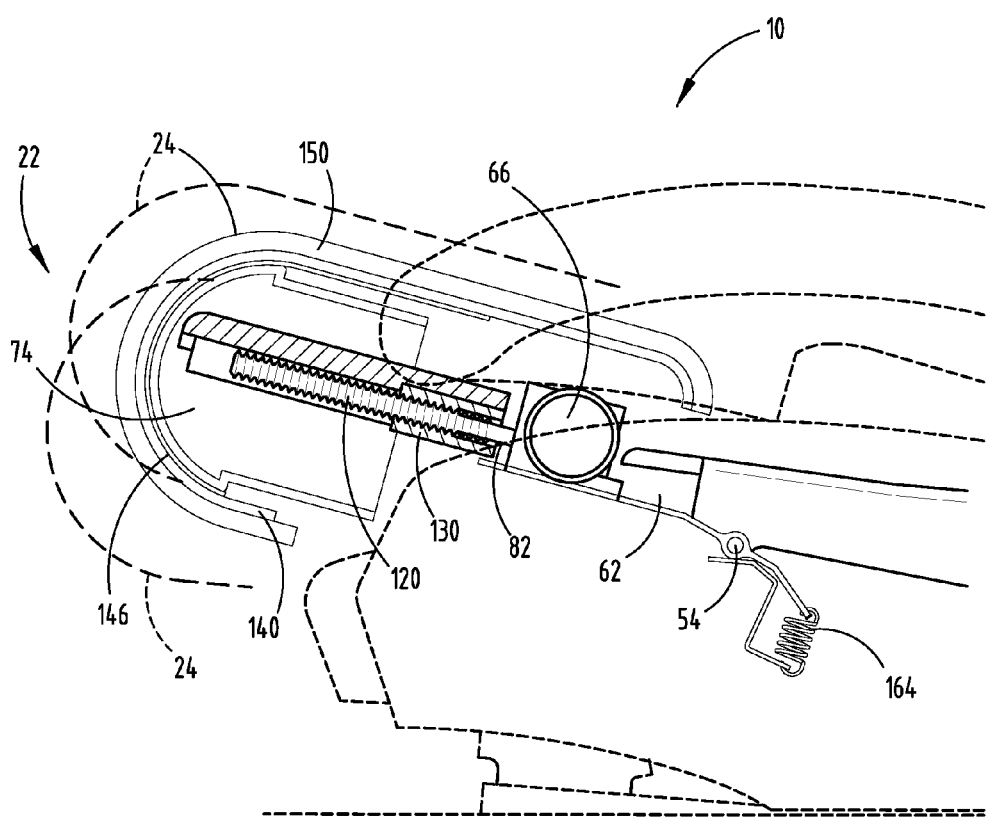
FIG. 13C is a partial side elevational cross-sectional view of the leg support of FIG. 13B after movement to the raised position and the retracted position.

As shown in the illustrated embodiment of FIGS. 13A and 13B, the first support base 62 of the second leg support 22 upon which the motor 66 is positioned is rotated upwardly (clockwise). As generally noted above, movement of the second leg support 22 by way of the second support base 62 can occur by the force of the tension springs 164 coupling the rearwardly extending flange 160 to the mounting bracket 166 in the seat 30, by a motor that is operably coupled with the second support base 62 to rotate the second support base 62 between the raised and lowered positions, or can be by way of a motor that is supplemented by the tension springs 164 that extend between the rearwardly extending flange 160 and the mounting bracket 166. It will be understood, as shown in FIG. 13C, that the first and second leg supports 14, 22 can be in the raised or lowered position, or any position therebetween, and at the same time, be in the extended or retracted position. FIG. 13C illustrates the second leg support 22 in the raised position and the retracted position. Movement of the first and second leg supports 14, 22 between the raised and lowered positions is independent of movement of the first and second leg supports 14, 22 between the extended and retracted positions.

The vehicle seating assembly as disclosed herein includes first and second independently moveable leg supports configured to provide independent support to the legs of a driver or passenger. For example, for a driver, frequently, the right leg of the driver is in an extended position to actuate the pedals. At the same time, the left leg of the driver is retracted to provide comfort to the driver. The vehicle seating assembly as disclosed herein can allow for additional support under the right leg of the driver, thereby minimizing the likelihood that the endurance of the driver will wane over long trips. The vehicle seating assembly as disclosed herein also provides additional comfort as the leg supports can be specifically moved and adjusted to conform to the preferred seating style of a particular driver or passenger.

It will be understood by one having ordinary skill in the art that construction of the described invention and other components is not limited to any specific material. Other exemplary embodiments of the invention disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the invention as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating positions, and arrangement of the desired and other exemplary embodiments without departing from the spirit of the present innovations.

It will be understood that any described processes or steps within described processes may be combined with other disclosed processes or steps to form structures within the scope of the present invention. The exemplary structures and processes disclosed herein are for illustrative purposes and are not to be construed as limiting.

It is also to be understood that variations and modifications can be made on the aforementioned structures and methods without departing from the concepts of the present invention, and further it is to be understood that such concepts are intended to be covered by the following claims unless these claims by their language expressly state otherwise.

What is claimed is:

1. A seating assembly comprising:
    a seat frame supporting a pivot rod; and
    first and second distinct leg supports pivotally coupled with the pivot rod, each leg support including:
        a support base supporting a motor that linearly translates an extendable member forward and rearward; and
        a rearward flange operably coupled to the support base, wherein the support base is rotatable about the pivot rod, and wherein the support base is biased to a raised position by an elastic member coupled with the rearward flange.

2. The seating assembly of claim 1, further comprising:
    a seat base disposed over the motor of the first distinct leg support and the motor of the second distinct leg support.

3. The seating assembly of claim 1, wherein the extendable member includes a flex member disposed thereon.

4. The seating assembly of claim 3, wherein the flex member includes an open matrix of flex apertures and a rounded forward portion.

5. The seating assembly of claim 1, wherein the elastic member includes at least one tension spring that biases a body portion upwardly and the rearward flange downwardly.

6. The seating assembly of claim 1, wherein the motor is operably coupled with and configured to rotate a screw gear.

7. The seating assembly of claim 6, further comprising:
    a slide block operably coupled with the extendable member and in engagement with the screw gear, the slide block configured to move linearly as the screw gear rotates.

8. A seating assembly comprising:
    a seat frame supporting a pivot rod;
    first and second distinct leg supports pivotally coupled with the pivot rod, each leg support including:
        a support base rotatable about the pivot rod, the support base being biased to a raised position by an elastic member coupled with the support base; and
        a motor disposed on the support base that linearly translates an extendable member forward and rearward over the support base.

9. The seating assembly of claim 8, further comprising:
    a seat base disposed over the motor of the first distinct leg support and the motor of the second distinct leg support.

10. The seating assembly of claim 8, wherein the extendable member includes a flex member disposed thereon.

11. The seating assembly of claim 10, wherein the flex member includes an open matrix of flex apertures and a rounded forward portion.

12. The seating assembly of claim 8, wherein the elastic member includes at least one tension spring that biases a body portion upwardly and a flange downwardly.

13. The seating assembly of claim 8, wherein the motor is operably coupled with and configured to rotate a screw gear.

14. The seating assembly of claim 13, further comprising:
    a slide block operably coupled with the extendable member and in engagement with the screw gear, the slide block configured to move linearly as the screw gear rotates.

15. A seating assembly comprising:
    a seat frame supporting a pivot rod;
    first and second distinct leg supports pivotally coupled with the pivot rod, each leg support including:
        a support base rotatable about the pivot rod, the support base being biased to a raised position by an elastic member coupled with the support base; and
        a motor disposed on the support base that linearly translates an extendable member having an open matrix of flex apertures.

16. The seating assembly of claim 15, further comprising:
 a seat base disposed over the motor of the first distinct leg support and the motor of the second distinct leg support.

17. The seating assembly of claim 15, wherein the extendable member includes a flex member disposed thereon having an open matrix of flex apertures and a rounded forward portion.

18. The seating assembly of claim 15, wherein the elastic member includes at least one tension spring that biases a body portion upwardly and a flange downwardly.

19. The seating assembly of claim 15, wherein the motor is operably coupled with and configured to rotate a screw gear.

20. The seating assembly of claim 19, further comprising:
 a slide block operably coupled with the extendable member and in engagement with the screw gear, the slide block configured to move linearly as the screw gear rotates.

\* \* \* \* \*